(12) United States Patent
Yoshida et al.

(10) Patent No.: US 7,287,670 B2
(45) Date of Patent: Oct. 30, 2007

(54) DEVICE UNIT, AND SYSTEM FOR FLUID EXTRACTION

(75) Inventors: Eiji Yoshida, c/o Everday Wine Co., Ltd., 1-6-5, Shibuya, Shibuya-ku, Tokyo 150-0002 (JP); Keiichi Yahagi, Tokyo (JP); Hiroyuki Matsunaga, Tokyo (JP); Satoshi Otake, Tokyo (JP); Hiroki Matsumoto, Tokyo (JP); Tatsuro Ishimatsu, Tokyo (JP); Yusuke Yoshida, Tokyo (JP); Kagenori Nagao, Tokyo (JP); Satomi Kudo, Tokyo (JP); Eri Kawaguchi, Tokyo (JP); Ikuo Andreas Nakayama, Tokyo (JP); Yuta Ogino, Tokyo (JP); Syotaro Nakajima, Tokyo (JP)

(73) Assignee: Eiji Yoshida, Tokyo (JP)

( * ) Notice: Subject to any disclaimer, the term of this patent is extended or adjusted under 35 U.S.C. 154(b) by 378 days.

(21) Appl. No.: 10/514,059

(22) PCT Filed: May 23, 2003

(86) PCT No.: PCT/JP03/06491

§ 371 (c)(1),
(2), (4) Date: Nov. 9, 2004

(87) PCT Pub. No.: WO03/099704

PCT Pub. Date: Dec. 4, 2003

(65) Prior Publication Data

US 2005/0230414 A1 Oct. 20, 2005

(30) Foreign Application Priority Data

May 23, 2002 (JP) ............................. 2002-149117
Mar. 10, 2003 (JP) ............................. 2003-064146

(51) Int. Cl.
B67D 5/08 (2006.01)
B67D 5/62 (2006.01)

(52) U.S. Cl. ............................. 222/1; 222/61; 222/129; 222/146.6; 222/399; 222/481.5

(58) Field of Classification Search ............... 222/1, 222/61, 129, 146.6, 399, 481.5, 518
See application file for complete search history.

(56) References Cited

U.S. PATENT DOCUMENTS 4,281,779 A * 8/1981 Shepard ............... 222/501

(Continued)

FOREIGN PATENT DOCUMENTS

GB 343328 2/1931

(Continued)

OTHER PUBLICATIONS

"*Microfilm of the specification and drawings annexed to the request of Japanese Utility Model Application* No. 45344/1988" (Laid Open No. 150600/1989); Oct. 18, 1989.

* cited by examiner

Primary Examiner—Joseph A. Kaufman
(74) Attorney, Agent, or Firm—Duane Morris LLP

(57) ABSTRACT

A fluid extracting device is structured to be capable of extracting only a predetermined amount of a fluid such as wine or the like while a deterioration preventive gas is being supplied to a bottle B and the fluid extracting device (60), which are coupled to each other in an airtight state. Consequently, the partial extraction in a plurality of operations is made possible without causing quality deterioration of the fluid such as wine or the like even after the bottle is once opened. Further, such a structure is provided that the fluid extracting devices (60) having a large number of bottles of wine or the like attached thereto are mounted on a display table at a wine bar or the like.

48 Claims, 18 Drawing Sheets

U.S. PATENT DOCUMENTS

| | | | |
|---|---|---|---|
| 4,555,371 A | 11/1985 | Jeans | |
| 4,706,847 A * | 11/1987 | Sankey et al. | 222/1 |
| 4,938,387 A * | 7/1990 | Kervefors et al. | 222/129.4 |
| 5,228,601 A | 7/1993 | Podesta | |
| 5,697,526 A * | 12/1997 | Lee | 222/113 |
| 5,848,736 A | 12/1998 | Boumann | |
| 6,200,488 B1 | 3/2001 | Crowley et al. | |
| 6,299,037 B1 * | 10/2001 | Lee | 222/518 |
| 6,913,167 B2 * | 7/2005 | Phelps et al. | 222/152 |
| 2002/0070234 A1 * | 6/2002 | Sunnarborg | 222/129 |

FOREIGN PATENT DOCUMENTS

| | | |
|---|---|---|
| JP | 60-183390 | 9/1985 |
| JP | 62-106827 | 5/1987 |
| JP | 4-087988 | 3/1992 |
| JP | 10-245099 | 12/1998 |
| JP | 2001-58700 | 3/2001 |
| JP | 2001-122397 | 5/2001 |
| JP | 2001-354206 | 12/2001 |
| WO | WO 9006896 | 4/1992 |
| WO | WO 03/016198 A1 | 2/2003 |

DEVICE UNIT, AND SYSTEM FOR FLUID EXTRACTION

TECHNICAL FIELD

The present invention relates to a fluid extracting device that prevents quality deterioration of liquid beverages such as wine contained in a bottle due to oxidation and so on, thereby preserving fresh taste over a long period, and to a fluid extracting unit and a fluid extracting system for wine and so on so structured to allow the fluid extracting device to be used on a bottle setting table for wine and so on at wine bars and so on, the unit and the system not only being highly functional and having a high visual aesthetic effect but also having a small-sized display arrangement structure with high cooling effect.

BACKGROUND ART

In recent years, wine has been remarkably popularized, and brands, producing areas, kinds, tastes, and the like of wine are diversified. This trend has been promoting the opening of bars specializing in wine, which are so-called wine bars, and they are offering various kinds of wines that meet the tastes of customers. In this case, trying wines of a large number of brands is necessary and in addition, there are demands for selling by measure such as so-called glass wine, and therefore, it is necessary to open a large number of bottles. However, since air is mixed into wine once bottles are opened, the deterioration of wine is inevitable. This leads to such a situation that opening of a bottle is hesitated or unconsumed wine left in a bottle is wasted due to bottle opening.

As a means for avoiding such inconvenience, a liquid preserving device structured as described below has been proposed (refer to Patent Document 1). This device includes: a pressure-reducing stopper which has a fluid passage communicating the inside of a container with the outside thereof and a down-flow valve for restricting the flow of a fluid in a direction of the inside of the container via the fluid passage and which is able to install detachably on an opening portion of the container for containing liquid; a pressure-feed stopper which has a fluid passage communicating the inside of the container with the outside thereof and a down-flow valve for restricting the flow of fluid in a direction of the outside of the container via the fluid passage and which is able to install detachably on the opening portion of the container for containing liquid; a connecting portion having a fluid passage connectable to the fluid passage of the pressure-reducing stopper or the pressure-feed stopper in an airtight state; a pressure-reducing means for discharging air from the inside of the container to the outside of the container via the fluid passage of the pressure-reducing stopper or the pressure-feed stopper; and a pressure-feed means for supplying carbon dioxide gas into the container via the fluid passages of the pressure-reducing stopper and the connecting portion.

Further, the applicant of this application previously proposed a wine extracting device so structured that the wine extracting device is attached to an opening portion of a bottle with the bottle placed upside down, and the bottle is opened while insoluble inert gas is being supplied, so that only a necessary amount of wine can be then extracted by the pressure of this gas (refer to Patent Document 2).

DISCLOSURE OF THE INVENTION

However, the liquid preserving device in the Patent Document 1 of the prior art is a large-scaled device and expensive, and therefore, it is not suitable for use anytime and anywhere. Moreover, even when once-opened bottle is filled in a seal state with an oxidation preventive gas and closed, the progress of quality deterioration cannot be thereafter avoided because air enters if the bottle is opened again. Therefore, it is not suitable for adoption for tasting sets, selling by weight, and so on offered at, for example, wine bars. Further, the wine extracting device of the Patent Document 2 according to the proposal by the applicant of this application also has some problems to be solved. Specifically, there remain problems in this device: firstly, wine is extracted while an insoluble inert gas is being supplied, but a troublesome operation such as rotating a cut cork by 90° at the opening portion of the bottle is required; and secondly, the operation for attaching the extracting device to the bottle is complicated.

An object of the present invention is to provide a fluid extracting device for wine and so on that is capable of extracting a fixed amount of a fluid such as wine when necessary, only requires easy operation for the extraction, and is usable for a long-term preservation, and moreover, to provide a fluid extracting unit and a fluid extracting system capable of providing convenience in the display and service at wine bars and so on through the use of this fluid extracting device.

In the present invention, means of the present invention taken for solving the aforesaid problems and the operations thereof are as follows. Here, the fluid includes not only liquid such as wine and carbonated water but also fluid in general such as lactic acid bacteria beverage, fruit juice with pulp, and fluid high in fluid drag such as edible oil.

A fluid extracting device according to a first invention includes: a device body having a fluid storage portion capable of storing a fluid in an airtight state; an extracting portion positioned under the device body and allowing the fluid in the fluid storage portion to flow down via an extraction valve; a gas supply port through which a deterioration preventive gas is to be supplied into the fluid storage portion; a valve driving portion for putting the extraction valve into operation; and an operation mechanism capable of operating the valve driving portion from an external part or the outside.

According to the fluid extracting device of the first invention, it is possible to block air entering and extract only a predetermined amount of an arbitrary fluid such as wine or the like from the fluid storage portion anytime while supplying the deterioration preventive gas. Consequently, partial extraction of a fluid such as wine, for example, in a plurality of operations is made possible without deteriorating its quality, which enables the extraction of a fixed amount of the fluid such as wine anytime when necessary and makes it possible to provide a fluid extracting device for wine or the like that only requires an easy operation for the extraction and is usable for long-term preservation.

A fluid extracting device according to a second invention is so structured: that an upper portion of the fluid storage portion has a mounting portion that is attachable to and detachable from a head portion of a bottle, which is placed upside down, in an airtight state; and that the mounting portion allows, when being attached to the head portion of the bottle, the fluid flowing down from the head portion of the bottle to flow down into the fluid storage portion in an airtight state.

According to the fluid extracting device of the second invention, it is possible to make a new supply of the fluid into the fluid storage portion from the bottle. Since the new supply of the fluid is conducted in the airtight state, the fluid never comes in contact with the air during this period. Therefore, it is possible to extract a larger amount of the fluid than a fluid amount storable in the fluid storage portion and further to effectively prevent the deterioration of such a fluid.

A fluid extracting device according to a third invention is so structured that the fluid flows down via a down-flow valve attached to the head portion of the bottle.

According to the fluid extracting device of the third invention, an amount of the fluid flowing down to the fluid storage portion from the bottle can be adjusted by opening/closing the down-flow valve.

A fluid extracting device according to a fourth invention is so structured: that the driving portion includes a first driving portion for putting the down-flow valve into operation and a second driving portion for putting the extraction valve into operation; and that the operation mechanism is capable of operating the first driving portion and the second driving portion simultaneously or separately from the outside.

According to the fluid extracting device of the fourth invention, the work of the operation mechanism makes it possible to operate the down-flow valve and the extraction valve simultaneously or separately. Selection between the simultaneous operation and the separate operation of the first driving portion and the second driving portion may be made as desired.

A fluid extracting device according to a fifth invention is so structured that, when the operation mechanism is arranged to be capable of operating the first driving portion and the second driving portion simultaneously, the second driving portion keeps the extraction valve closed while the first driving portion is driving the down-flow valve to open, and the down-flow valve is kept closed while the second driving portion is driving the extraction valve to open.

According to the fluid extracting device of the fifth invention, the down-flow valve and the extraction valve are never open simultaneously. Consequently, the fluid is not directly extracted to the outside from the bottle. If the direct extraction should be made, the air flowing in a reverse direction through the extraction valve could enter the inside of the bottle, but such a situation does not occur since the down-flow valve is kept closed while the extraction valve is open and the deterioration preventive gas is continuously supplied into the fluid storage portion, so that there remains no room for the air to enter.

A fluid extracting device according to a sixth invention is so structured: that the down-flow valve includes: a valve body having a hollow portion attachable to the head portion of the bottle; a discharge valve capable of advancing and retreating in the hollow portion relative to the valve body; a biasing member disposed in the hollow portion in order to bias the discharge valve in a direction of the fluid storage portion; and an abutted portion having a down-flow hole that is closed when abutted on by the discharge valve biased in the hollow portion; that a recessed portion communicating with the hollow portion is formed in an end portion of the valve body in the direction of the fluid storage portion; and that at least one streak of vertical groove is formed on an inner wall surrounding the hollow portion inside the hollow portion at least from the abutted portion.

According to the fluid extracting device of the sixth invention, owing to the inclusion of at least the above-described structure, it is possible to effectively prevent the stagnation of the fluid flowing down from an outlet of the down-flow valve, namely, the down-flow hole of the abutted portion. Specifically, the fluid trying to flow down from the down-flow hole sometimes stagnates at the down-flow hole and does not flow down due to its surface tension, which is thought to be caused by individual or correlative influence by the size and shape of the down-flow hole, viscosity of the fluid, pressure of the supplied deterioration preventive gas, and so on. Though the specific-causal relationship is not clear, it has been experimentally confirmed that such stagnation can be prevented when the down-flow valve includes the above-described structure.

A fluid extracting device according to a seventh invention is so structured that the biasing member is a coil spring and a center axis of the coil spring is nonlinear. The nonlinear center axis causes the pressure given to the abutted portion via the discharge valve to be uneven in the periphery of the down-flow hole. This is thought to be contributing to the prevention of the fluid stagnation. The fluid extracting device according to the sixth invention can also prevent the fluid stagnation to some extent, but it has been experimentally confirmed that the co-use of the above-described coil spring can realize the prevention of the fluid stagnation with higher reliability.

A fluid extracting device according to an eighth invention is so structured that the extraction valve has a large-diameter rod portion capable of closing a down-flow hole portion provided in a lower portion of the fluid storage portion.

According to the fluid extracting device of the eighth invention, it is possible to constitute the valve with a small number of components, namely, the down-flow hole portion and the large-diameter rod portion. Owing to such a constitution, the opening/closing of the down-flow hole portion, in other words, the execution and termination of the fluid extraction can be conducted only by the descent and ascent of the large-diameter rod portion.

A fluid extracting device according to a ninth invention is so structured: that a driving rod capable of moving upward and downward by the operation of the operation mechanism is provided in the device body; and that an upper end portion of the driving rod is capable of functioning as the first driving portion and a lower end portion of the driving rod is capable of functioning as the second driving portion.

According to the fluid extracting device of the ninth invention, the down-flow valve and the extraction valve can be opened/closed only by the ascent and descent of the driving rod. The down-flow valve and the extraction valve are operated only by the driving rod, so that, when the driving rod is moved upward to open the down-flow valve, the extraction valve is closed, and on the other hand, when the driving rod is moved downward, the down-flow valve is closed and the extraction valve is opened.

According to a fluid extracting device of a tenth invention, a rod bearing body is provided in an upper portion of the fluid storage portion. The rod bearing body includes an inner bearing supporting the driving rod to be able to slide, an inside-diameter portion surrounding the inner bearing, a down-flow passage for the fluid formed between the inner bearing and the inside-diameter portion, a gas supply passage capable of supplying the deterioration preventive gas into the fluid storage portion, and a ring-shaped projecting portion including a hollow portion communicating with the down-flow passage and projecting to such a position that an end portion of the ring-shaped projecting portion is capable of coming into contact with the fluid stored in the fluid storage portion.

According to the fluid extracting device of the tenth invention, the inner bearing of the rod bearing body supports the driving rod to be able to slide, and the deterioration preventive gas is also supplied into the fluid storage portion via the gas supply passage. The fluid flows down via the down-flow passage and further passes through the hollow portion of the ring-shaped projecting portion communicating with the down-flow passage to flow down into the fluid storage portion. When the fluid flows down into the storage portion, the deterioration preventive gas of which amount corresponds to that of the flowed fluid flows in a revere direction through the down-flow passage from the hollow portion. When the storage level in the fluid storage portion is raised due to the flow-down of the fluid from the bottle to reach the lower end of the ring-shaped projecting portion, an opening of the ring-shaped projecting portion is closed by the stored fluid. This prevents the deterioration preventive gas from flowing into the hollow portion of the ring-shaped projecting portion, thereby stopping the flow-down of the fluid automatically. By appropriately determining a projection amount of the ring-shaped projecting portion, a fluid amount to be stored in the fluid extracting portion can be set so as to constantly become a predetermined amount. This eliminates the trouble of operating the operation arm under the monitoring of a flow-down amount of the fluid by an eye-observation of measurement calibrations or the like of the fluid storage portion.

In a fluid extracting device according to an eleventh invention, an air vent valve for exhausting air inside the fluid storage portion is provided. The air vent valve may be a manual one, but an automatic one that automatically opens when the pressure reaches a predetermined value and closes when the pressure reaches a predetermined value or lower is more convenient.

According to the fluid extracting device of the eleventh invention, when the pressure inside the fluid storage portion reaches a predetermined value or higher for some reason at the time of the supply of the deterioration preventive gas, it is opened to cause the inside deterioration preventive gas and so on to escape, so that the pressure can be returned to a normal state. When the deterioration preventive gas is supplied, it is possible to exclude the air left in the fluid storage portion by opening the extraction valve, but it is also possible to supply the deterioration preventive gas while the extraction valve is kept closed and exclude the air by the action of the air vent valve.

A fluid extracting device according to a twelfth invention is so structured that the extracting portion includes: an outer cylinder connectable to a lower portion of the fluid storage portion; an inner cylinder fitted in an inner peripheral portion of the outer cylinder; a guide cylinder vertically extending in a range from the lower portion of the fluid storage portion to a position of a substantially center portion of the extracting portion; a joint member fitted in a lower inner peripheral portion of the guide cylinder to be connected to a lower end portion of the driving rod; and an up and down movement member supporting a lower end portion of the joint member and fitted to be able to move upward and downward in a lower outer peripheral portion of the guide cylinder. Further, an extraction pipe is connected to a lower portion of the joint member and the extraction pipe extends to a position lower than a lower end portion of the extracting portion.

According to the fluid extracting device of the twelfth invention, when the driving rod and the extraction pipe which are integral with the up and down movement member via the joint member are moved upward and downward, the fluid such as wine in the bottle is stored temporarily in the fluid storage portion and further passes through the extraction pipe, so that the fluid can be poured to a glass or the like. Also in this case, the continuous supply of the deterioration preventive gas blocks air entering, which prevents quality deterioration of the fluid such as wine.

A fluid extracting device according to a thirteenth invention proposes a fluid extracting device for wine and so on so structured that the operation mechanism includes: an operation arm provided to be able to swing on an outer side of the extracting portion; the up and down movement member provided to be movable upward and downward in the extracting portion by the operation arm; and the joint member coupled to the up and down movement member and the driving rod in an airtight state.

According to the fluid extracting device of the thirteenth invention, the operation mechanism is constituted of the operation arm provided to be able to swing outside the extracting portion, the up and down movement member provided to be movable upward and downward in the extracting portion by the operation arm, and the joint member coupled in an airtight state to the driving rod vertically extending from the up and down movement member and the device body to the extracting portion. The extraction of the fluid in the bottle is conducted in such a manner that the driving rod is moved upward and downward under the airtight state, and the down-flow valve for the bottle and the extraction valve are thereby opened/closed. The rise and fall operation of the operation mechanism allows the up and down movement member in the extracting portion to be able to move upward and downward by the vertical movement of the operation arm. The operation mechanism is structured to be able to operate the driving rod inside the extracting portion from the outside thereof while the airtight is maintained, and it makes it possible to extract a predetermined amount of the fluid anytime when necessary.

In a fluid extracting device according to a fourteenth invention, the fluid storage portion is constituted of a transparent material or a translucent material. Since it is constituted of the transparent material or the translucent material, the flow-down state of the fluid into the fluid storage portion can be visually recognized. This enables the recognition of the existence or nonexistence of the fluid flow-down and an arbitrary increase/decrease of an extracted amount as required.

A fluid extracting device according to a fifteenth invention is so structured that the head portion of the bottle and the mounting portion are connectable to each other via a coupling assist including a wide ring press-fitted to the head portion of the bottle and a coupling nut so formed that an inner peripheral portion thereof is capable of being in close contact with the wide ring. The coupling assist enables the connection between the head portion of the bottle and the device under the state in which airtight is being maintained, and when they are coupled to each other via the coupling portion, air entering is blocked by the wide ring. Further, since it is attachable and detachable only by rotating the coupling nut, it is easy to operate.

A fluid extracting device according to a sixteenth invention is a fluid extracting device for extracting a fluid from a bottle containing the fluid via a down-flow valve attached to a head portion of the bottle which is placed upside down, the device including: a device body having a mounting portion attachable to and detachable from the head portion of the bottle in an airtight state and a fluid storage portion capable of storing the fluid flowing down via the down-flow valve in an airtight state; an extracting portion positioned under the device body, for allowing the fluid in the fluid storage portion to flow down via an extraction valve; a gas supply port through which a deterioration preventive gas is to be supplied into a fluid down-flow passage between the down-flow valve and the extraction valve; a first driving portion for putting the down-flow valve into operation; a second driving portion for putting the extraction valve into operation; and an operation mechanism capable of operating the first driving portion and the second driving portion simultaneously or separately from the outside.

According to the fluid extracting device of the sixteenth invention, an arbitrary fluid such as wine can be made to flow down to the fluid storage portion from the bottle via the down-flow valve anytime while the air entering is being blocked and the deterioration preventive gas is being supplied, and moreover, only a predetermined amount can be extracted from the fluid storage portion. Consequently, it is possible, for example, to partially extract the fluid such as wine in a plurality of operations without deteriorating its quality, so that a fixed amount of the fluid such as wine can be extracted anytime when necessary, and it is possible to provide a fluid extracting device for wine and so on that requires only an easy operation for the extraction and is suitable for a long-term preservation.

A fluid extracting device according to a seventeenth invention is so structured that, when the operation mechanism is arranged to be capable of operating the first driving portion and the second driving portion simultaneously, the second driving portion keeps the extraction valve closed while the first driving portion is driving the down-flow valve to open, and the down-flow valve is kept closed while the second driving portion is driving the extraction valve to open.

According to the fluid extracting device of the seventeenth invention, the down-flow valve and the extraction valve are never open simultaneously. Consequently, the fluid is never directly extracted to the outside from the bottle. If the direct extraction should be made, the air flowing in a reverse direction through the extraction valve could enter the inside of the bottle, but such a situation does not occur since the down-flow valve is kept closed while the extraction valve is open and the deterioration preventive gas is continuously supplied into the fluid storage portion, so that there remains no room for the air to flow therein.

A fluid extracting method according to an eighteenth invention is a fluid extracting method for extracting a fluid from a bottle via a down-flow valve attached to a head portion of the bottle containing the fluid, the method including: a first step of storing the fluid in the airtight storage body filled with a deterioration preventive gas by opening the down-flow valve to cause the fluid to flow down; and a second step of discharging the fluid stored in the airtight storage body to the outside by opening an extraction valve included in the airtight storage body.

According to the fluid extracting method of the eighteenth invention, the flow-down of the fluid in the bottle is controlled by the opening/closing operation of the down-flow valve in the first step to allow the fluid to flow into the airtight storage body, and the extraction of the fluid stored in the airtight storage body is made controllable by the opening/closing operation of the extraction valve in the second step. The extracting method includes not only a fluid extracting method using the fluid extracting device according to the present invention but also includes a wide variety of fluid extracting methods including the above-described steps. Any of the methods is executed under the state in which air entering that may cause the deterioration of fluid quality is blocked, so that a fluid such as wine can be extracted anytime without causing any quality deterioration. Here, the airtight storage body represents a container storing, in an airtight state, the fluid flowing out of the bottle, and specifically, it also includes the above-described fluid storage portion.

A fluid extracting method according to a nineteenth invention is characterized in that the first step includes a step of exhausting air inside the airtight storage body and instead supplying the deterioration preventive gas. When no harmful gas such as air exists in the airtight storage body and the inside of the airtight storage body is entirely filled with the deterioration preventive gas, the air exhausting step may be unnecessary, but otherwise, the air exhausting step is necessary since the prevention of the fluid quality deterioration cannot be expected unless the air is excluded.

A fluid extracting method according to a twentieth invention is characterized in that each of the first step and the second step includes a step of continuously supplying the deterioration preventive gas. This is intended for preventing pressure reduction by constantly making a new supply of the deterioration preventive gas, thereby enabling the fluid to smoothly flow out, since the extraction of the fluid in the bottle lowers the inside pressure to be a cause of obstructing the discharge of the fluid.

A fluid extracting unit according to a twenty-first invention is so structured that a fluid extracting device is mounted on a display table, the fluid extracting device being fixed to an opening portion of a table plate of the display table.

According to the fluid extracting unit of the twenty-first invention, since the fluid extracting device is fixed to the opening portion of the table plate of the display table, a large number of bottles for wine and so on can be arranged on the display table. Therefore, when the fluid extracting unit is installed at a wine corner or the like, service to customers and so on can be improved and visual appearance can be enhanced.

A fluid extracting unit according to a twenty-second invention is so structured that the fluid extracting device is the fluid extracting device according to any one of the second to seventeenth inventions, and the specified fluid extracting device is mounted on the display table.

According to the fluid extracting unit of the twenty-second invention, since the fluid extracting device is fixed to the display table, a large number of bottles of wine and so on can be arranged on the display table. Therefore, when the fluid extracting unit is installed at a wine corner or the like, service to customers and so on can be improved and visual appearance can be enhanced.

A fluid extracting unit according to a twenty-third invention is so structured that a bottomed bottle holder is fixed to a rear face side of the opening portion of the table plate of the display table and the fluid extracting device is fixed to a lower portion of the bottle holder.

According to the fluid extracting unit of the twenty-third invention, the fluid extracting device is fixed to the bottle holder attached to the rear face side of the opening portion of the table plate of the display table, and therefore, since it is only necessary to cool a portion excluding the bottle holder portion (an upper portion of the bottle when the bottle is placed upside down) when, for example, the bottle is cooled, a cooling space can be made small, so that a cooling device for the bottle can be downsized.

A fluid extracting unit according to a twenty-fourth invention is so structured that the bottle holder has an opening at a center of a bottom portion thereof and a sidewall rising from a peripheral edge of the bottom portion, an upper end of the sidewall being fixed to the rear face of the table plate and the fluid extracting device being attached to the opening.

According to the fluid extracting unit of the twenty-fourth invention, easy attachment/detachment of the fluid extracting device is realized only by fixing the fluid extracting device to the opening of the bottom portion by screwing and so on.

A fluid extracting unit according to a twenty-fifth invention is so structured that a centering device for holing the bottle is disposed on an upper face side of the opening portion of the table plate.

According to the fluid extracting unit of the twenty-fifth invention, since the fluid extracting device is one that the bottle is mounted on the bottle holder or the like in an upside down state, the centering device can keep the posture of the bottle at a center portion after the mounting, which can surely prevent the formation of a gap through which air may possibly enter from a bottle mounting portion.

A fluid extracting unit according to a twenty-sixth invention is so structured that the centering device is constituted of a biasing/holding means that comes in contact with an outer periphery of the bottle at least at three points to bias the bottle toward a center.

According to the fluid extracting unit of the twenty-sixth invention, since the bottle is mounted on the bottle holder or the like in an upside down state relative to the fluid extracting device, as the bottle is newer, keeping the inverted state is more unstably. But the centering device constituted of the biasing/holding means with three-point contact allows the posture of the mounted bottle to be properly held at the center position, which can surely prevent the inconvenience of causing the formation of a gap through which air may possibly enter from a bottle mounting portion.

A fluid extracting unit according to a twenty-seventh invention is so structured that the biasing/holding means is constituted of a spring means having at least three springs hung between props.

According to the fluid extracting unit of the twenty-seventh invention, the posture of the bottle can be properly held at the center portion by the biasing/holding means constituted of the three spring means, and since the bottle is mounted in the upside down state relative to the fluid extracting unit, the biasing/holding means can surely prevent the inconvenience of causing the formation of a gap through which air may possibly enter from a bottle mounting portion.

In a fluid extracting unit according to a twenty-eighth invention, the bottle holder is provided with a clamp structure for preventing the bottle to which the fluid extracting device is attached from coming off.

According to the fluid extracting unit of the twenty-eighth invention, the work of the clamp structure prevents the bottle from coming off, so that airtight between the bottle and the fluid extracting device is fully maintained. This eliminates the possibility of air entering into the fluid storage portion which is caused when the bottle comes off, and the deterioration of the fluid can be accordingly prevented with high reliability.

A fluid extracting unit according to a twenty-ninth invention is so structured that one or plurality of box cells are disposed on the display table.

According to the fluid extracting unit of the twenty-ninth invention, since the box cell housing the fluid extracting device is disposed on the display table in the fluid extracting unit for wine and so on, a display effect to customers and so on can be greatly enhanced when it is installed at a wine corner or the like.

A fluid extracting unit according to thirtieth invention is so structured that the plurality of box cells are disposed on the display table.

According to the fluid extracting unit of the thirtieth invention, a plurality of bottles can be displayed on the display table by disposing the plurality of box cells thereon, so that the appearance of the display table is improved and at the same time, a display effect to customers and so on can be greatly enhanced when it is installed at a wine corner or the like.

A fluid extracting unit according to a thirty-first invention is so structured that the plurality of box cells are arranged with level difference in a stepped form.

According to the fluid extracting unit of the thirty-first invention, the plurality of box cells are arranged on the display table with the level difference in the stepped form, and therefore, when it is installed at a wine corner or the like, not only the appearance of the display table is improved and at the same time, a display effect to customers and so on can be greatly enhanced, but also it is convenient for serving staff in handling bottles and so on since the height becomes lower toward the front side.

A fluid extracting unit according to a thirty-second invention is so structured that the box cell is made of a transparent or translucent material.

According to the fluid extracting unit of the thirty-second invention, since the box cell is made of the transparent or translucent material, it is possible to see the display state of the plurality of box cells disposed on the display table through the box cells. Accordingly, when it is disposed at a wine corner or the like, not only the appearance of the display table is improved and at the same time, a display effect to customers and so on can be greatly enhanced, but also it is convenient for serving staff in handling bottles and so on since they can confirm orders and so on from customers.

A fluid extracting unit according to a thirty-third invention is so structured that the box cell has a wall portion surrounding a side portion and a cover plate at a top portion thereof.

According to the fluid extracting unit of the thirty-third invention, since the box cell is constituted of the wall portion surrounding the side portion and the cover plate at the top portion thereof, it is possible to easily attach/detach the bottle by opening/closing the cover plate of the box cell when the bottle is to be attached to and detached from the fluid extracting device.

A fluid extracting unit according to a thirty-fourth invention is so structured that a lower edge portion of the wall portion of the box cell is fixed onto the display table.

According to the fluid extracting unit of the thirty-fourth invention, since the lower edge portion of the wall portion of the box cell is fixed onto the display table, the box cell can be surely and firmly fixed.

A fluid extracting unit according to a thirty-fifth invention is so structured that the cover plate of the box cell is formed to be freely opened/closed.

According to the fluid extracting unit of the thirty-fifth invention, since the cover plate of the box cell is formed to be freely opened/closed, the bottle can be easily attached/detached by opening/closing the cover plate of the box cell when the bottle is to be attached to and detached from the fluid extracting device.

A fluid extracting unit according to a thirty-sixth invention is so structured that a bottom portion of the box cell is constituted of the table plate of the display table.

According to the fluid extracting unit of the thirty-sixth invention, since the bottom portion of the box cell to which the fluid extracting device for wine and so on is attached is constituted of the table plate of the display table, free arrangement such as planar arrangement and stepped arrangement of the display table is possible, thereby enabling the display table to make adaptable according to the installation state of a wine corner or the like, and a display effect to customers and so on to greatly improve.

A fluid extracting unit according to a thirty-seventh invention is so structured that at least one box cell is disposed on the display table.

According to the fluid extracting unit of the thirty-seventh invention, it is possible to dispose, on the table plate of the display table, one box cell or more to which the fluid extracting device for wine or the like is attached. Therefore, when the box cell is provided for each bottle of wine or the like, it is advantageous in that delicate temperature control for each variety, brand, producing area is made possible.

A fluid extracting unit according to a thirty-eighth invention is so structured that the display table has the plurality of table plates and the box cell is disposed on each of the table plates.

According to the fluid extracting unit of the thirty-eighth invention, it is possible to dispose on each of the table plates of the display table the box cell to which the fluid extracting device is to be attached, so that it is possible for the respective table plates of the display table to make differences of level and for the respective box cells to have different heights depending on the bottles, which can enhance a visual display effect.

A fluid extracting unit according to a thirty-ninth invention is so structured that the plurality of table plates of the display table are arranged in a stepped form with a plurality of steps by making different mounting positions of the respective table plates on the wall portions of the box cells.

According to the fluid extracting unit of the thirty-ninth invention, the change of the difference in level is formed by adjusting the mounting positions of the table plates constituting the bottom portions of the box cells by means of the mounting positions of the box cells on the wall portions, so that it is easy to arrange and form the display table in the stepped form.

A fluid extracting unit according to a fortieth invention is so structured that the plurality of box cells are so formed that heights of the wall portions of the respective box cells are changed stepwise so as to form stepped heights.

According to the fluid extracting unit of the fortieth invention, the heights of the wall portions of the respective box cells are changed stepwise when the display table is to be arranged in the stepped form, so that the mounting positions of the table plates can be adjusted and the stepped heights can be easily adjusted and formed.

A fluid extracting unit according to a forty-first invention is so structured that the wall portion, the cover plate, and the table plate of the box cell define a space.

According to the fluid extracting unit of the forty-first invention, the box cell to which the fluid extracting device for wine or the like is attached is so structured that the space can be formed between the table plate being the bottom portion thereof and the cover plate, and when an interval between the table plate and the cover plate in the space is appropriately adjusted, the volume capacity of the space can be adjusted in designing.

A fluid extracting unit according to a forty-second invention is so structured that the space forms a cooling chamber.

According to the fluid extracting unit of the forty-second invention, the space which is formed between the table plate and the cover plate as described above can be constituted as a cooling chamber for cooling the bottle, and the volume capacity of the cooling chamber can be adjusted by the adjustment of the interval between the table plate and the cover plate.

A fluid extracting unit according to a forty-third invention is so structured that at least one cooling device is disposed in the box cell.

According to the fluid extracting unit of the forty-third invention, the space constituting the cooling chamber is formed in the box cell, and by disposing in each of the cooling chambers one cooling device or more for cooling a fluid, for example, an air in the space of the cooling chamber, the fluid such as wine in the bottle can be efficiently cooled.

A fluid extracting unit according to a forty-fourth invention is so structured that the cooling device is constituted of a thermoelectric module using a Peltier element.

According to the fluid extracting unit of the forty-fourth invention, the thermoelectric module using the Peltier element is used as the cooling device for cooling the bottle for wine or the like housed in the box cell, so that a fluid extracting unit for wine or the like being small in size and excellent in cooling efficiency is obtainable.

A fluid extracting unit according to a forty-fifth invention is so structured that a temperature control device is provided in the cooling device.

When a bottle housed in the box cell, for example, a bottle of wine is to be cooled, delicate temperature control is necessary for each bottle according to the variety, brand, and producing area. By means of the structure of the fluid extracting unit according to the forty-fifth invention, the temperature control device is provided in the cooling device of the fluid extracting unit for this purpose, so that optimum temperature control is realized.

A fluid extracting unit according to a fifty-sixth invention is so structured that a deterioration preventive gas supply unit is disposed on the display table.

According to the fluid extracting unit of the forty-sixth invention, the deterioration preventive gas supply unit, which supplies the deterioration preventive gas to the fluid extracting device in the fluid extracting unit attached to the bottle for wine or the like, is disposed on the display table, so that an installation place of the display table can be freely set at a wine hall and so on.

A fluid extracting system according to a forty-seventh invention includes a fluid extracting unit having a fluid extracting device, the fluid extracting unit being the fluid extracting unit according to any one of the twenty-second to forth-sixth inventions.

According to the fluid extracting system of the forty-seventh invention, since it is a fluid extracting system including the fluid extracting unit according to any one of the twenty-second to forty-sixth inventions, it is possible to dispose a large number of bottles of wine and so forth on the display table, and when the fluid extracting system is installed at a wine corner or the like, service to customers and so on can be improved and enhanced visual appearance is obtainable.

A fluid extracting system according to a forth-eighth invention is so structured that the cooling device of the fluid extracting unit has a temperature control device, and the deterioration preventive gas supply unit includes a gas bomb, a gas supply pipe, and a pressure control device.

According to the fluid extracting system of the forty-eighth invention, the deterioration preventive gas supply unit for supplying the deterioration preventive gas to the fluid extracting devices for wine and so on of the fluid extracting unit is incorporated, and the cooling device for cooling the bottles of wine and so on and the temperature control device are disposed, so that delicate optimum temperature control of the bottles can be conducted according to the variety, brand, and producing area of wine and so on housed in the box cells. In addition, the system is constituted as a fluid extracting system in which the deterioration preventive gas supply unit is disposed on the display table, so that, when the display table in which the fluid extracting system having bottles of wine and so on mounted thereon is installed at a wine hall or the like, the display table, if it is the display table with casters, can move freely, and even if the display table is a fixed type, the installation place can be freely set.

A fluid extracting system according to a forty-ninth invention is so structured that the deterioration preventive gas supply unit includes: a gas supply pipe connecting from the gas bomb to the fluid extracting device; and a pressure control device disposed on a downstream side of the gas bomb and constituted of a pressure valve, a pressure regulator, and a pressure gauge.

According to the fluid extracting system of the forty-ninth invention, such a structure is adopted that the deterioration preventive gas supply unit having the pressure control device, which is constituted of the pressure valve, the pressure regulator, and the pressure gauge, is incorporated in the fluid extracting system together with the temperature control device for conducting delicate optimum temperature control of the bottles according to the variety, brand, and producing area of wine and so on housed in the box cells, so that it is possible to cool and maintain the bottles of wine and so on at optimum temperatures that are set delicately, and to connect the deterioration preventive gas supply unit to each of the fluid extracting devices via the gas supply pipe. Further, when the display table in which the fluid extracting system having the bottles of wine and so on attached thereto is installed at a wine hall or the like, the display table, if it is the display table with casters, can move freely, and even if the display table is a fixed type, the installation place can be freely set

BEST MODE FOR CARRYING OUT THE INVENTION

Hereinafter, embodiments of the present invention (hereinafter, referred to as "this embodiment" when appropriate) will be explained with reference to the drawings.

(Structure of Fluid Extracting Device Attached to Bottle of Wine or the Like)

First, as the structure of a fluid extracting device for oxidation prevention, the structure in which it is applied to a bottle of a beverage such as wine will be explained in this embodiment. A fluid extracting device 60 is attached to this beverage bottle, the fluid extracting device 60 being capable of extracting a beverage such as wine anytime from the bottle in which a down-flow valve is press-fitted in place of an existing cork stopper, without deteriorating the quality. Further, a coupling assist 90 for coupling this fluid extracting device 60 to the bottle in an airtight state is provided. The fluid extracting device 60 is capable of extracting wine or the like while preventing air, which deteriorates the quality of a fluid beverage such as wine, from entering the inside of the bottle.

Figure 1:
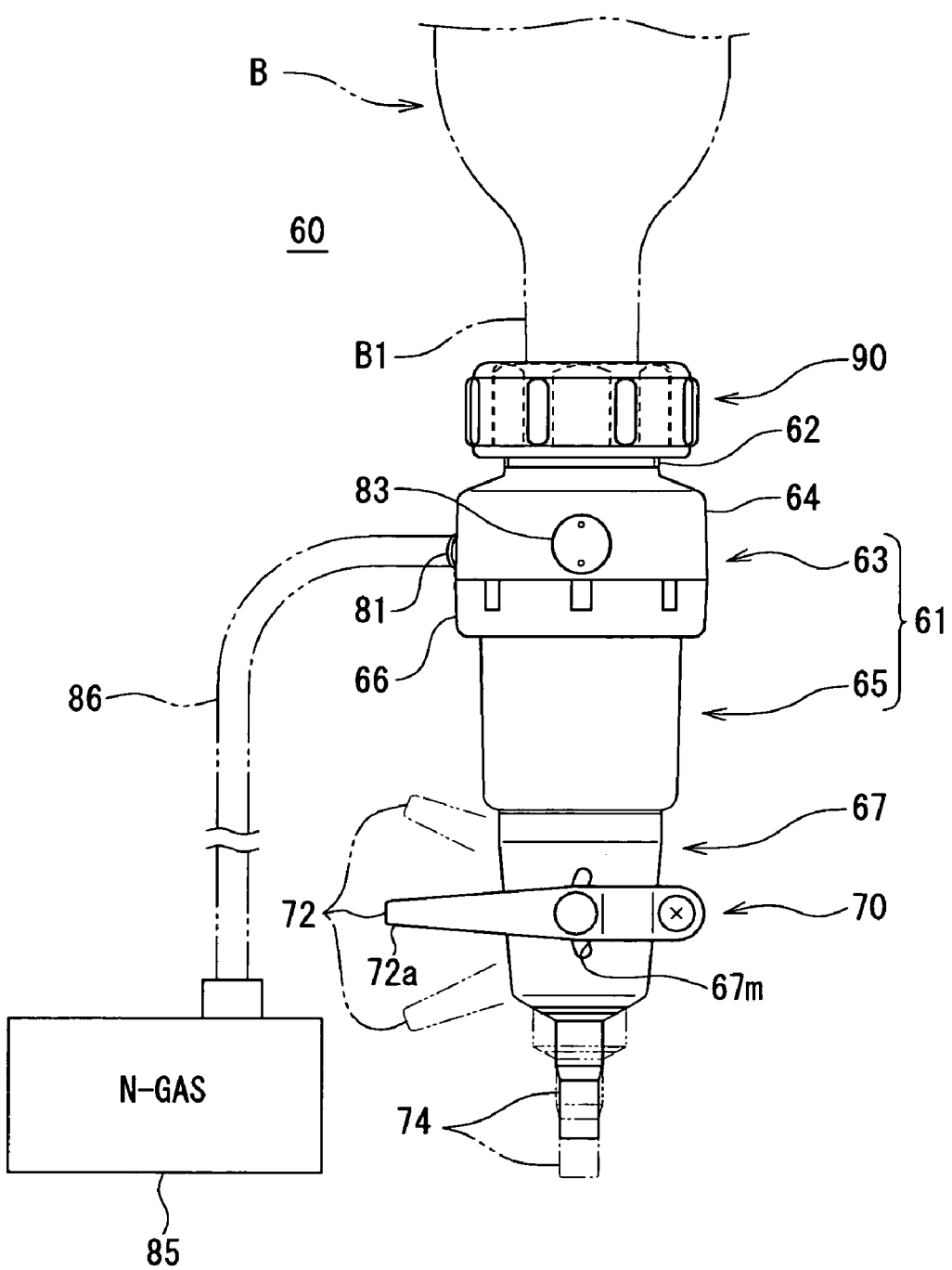
FIG. 1 is a front view of an embodiment of a fluid extracting device.
Figure 3:
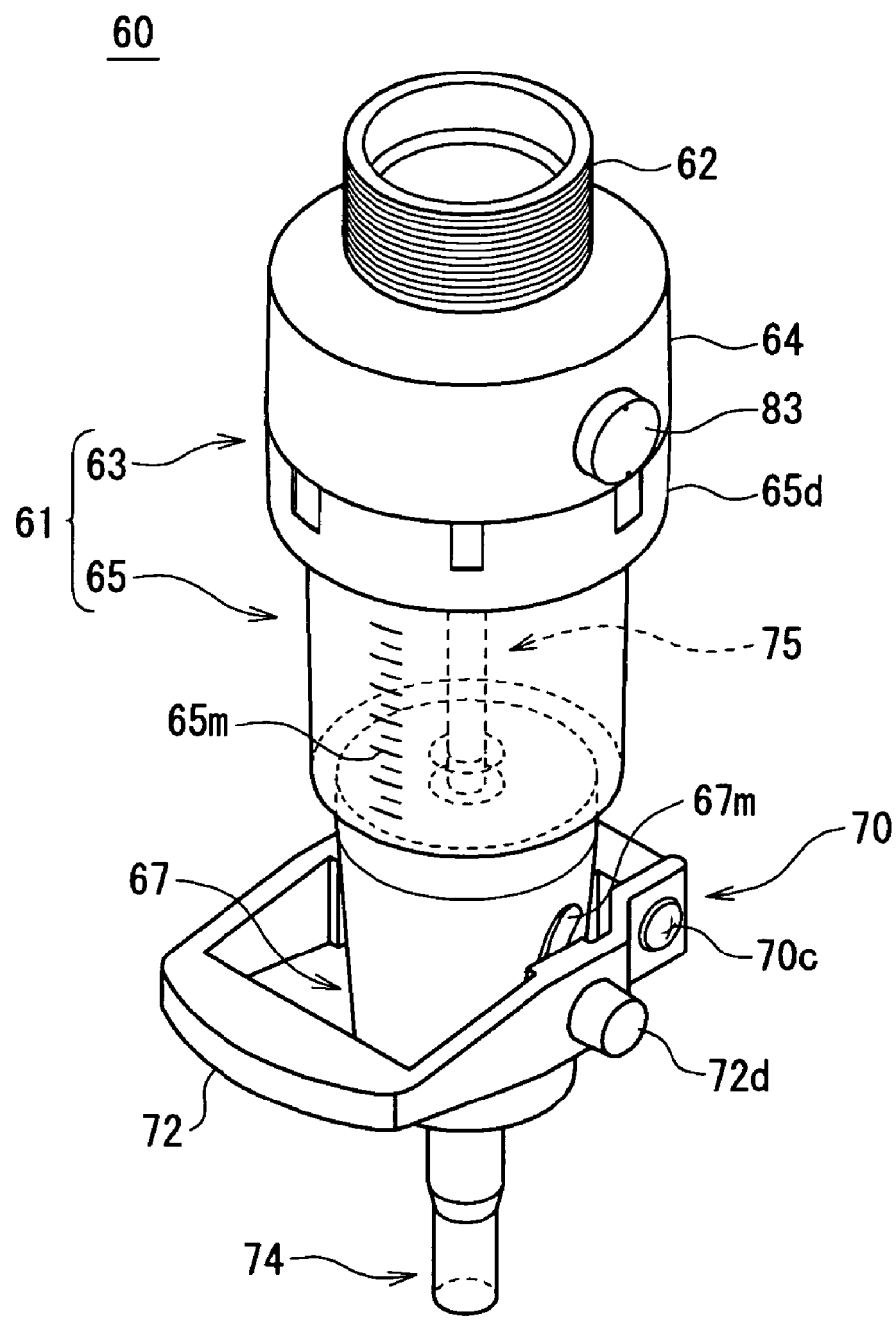
FIG. 3 is a perspective view of the embodiment of the fluid extracting device.
Figure 4:
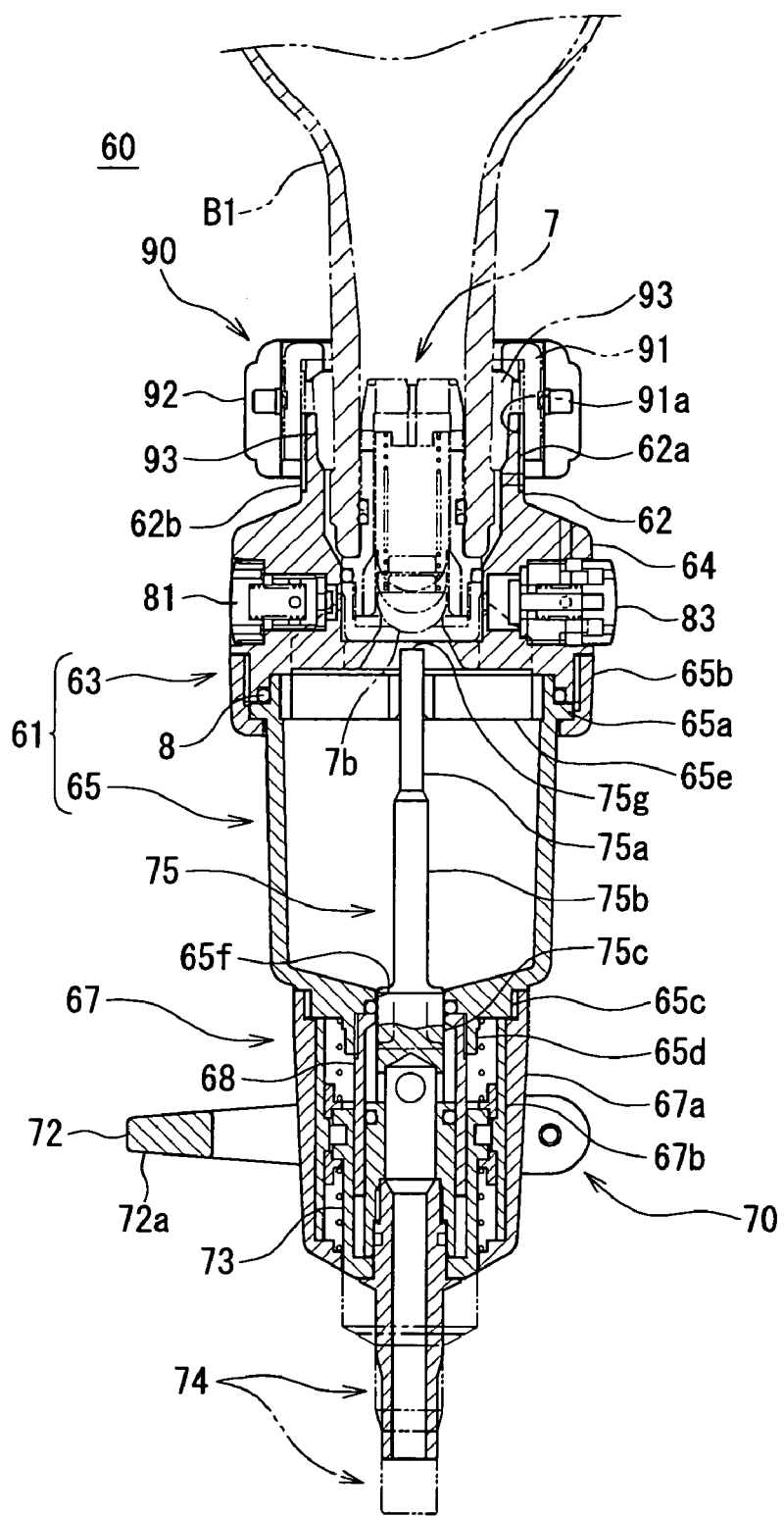
FIG. 4 is a cross sectional view of the embodiment of the fluid extracting device.

FIGS. 1 and 3 show an external structure of the fluid extracting device 60. This structure allows the fluid extracting device 60 to be attached to a head portion B1 of a bottle B containing a fluid such as wine in the airtight state via the coupling assist 90. As an example of the coupling assist 90, adopted is the one constituted of the combination of a coupling nut 91 that can be loosely fitted to the bottle head portion B1 and a wide ring 93 as a packing made of an elastic material that can be press-fitted to the bottle head portion, as shown in FIG. 4. The coupling nut 91 can maintain internal and external airtight when a hole portion in a lower portion thereof comes in press contact with the press-fitted wide ring 93. A female thread portion 91a provided on an upper inner peripheral portion of this coupling nut 91 can be screw-connected with a male thread portion 62a provided on an outer peripheral portion of a mounting portion 63 of the fluid extracting device. When the female thread portion 91a and the male thread portion 62a are thus screw-connected, the bottle B and the fluid extracting device 60 can be connected to each other under the airtight state. Incidentally, a ring cover 92 is attached to an outer peripheral portion of the coupling nut 91 of the coupling assist 90 in the drawing and this is intended for the coupling nut to be easily operated.

As shown in FIGS. 1 and 3, main constituent elements of the fluid extracting device 60 in appearance are three elements, namely, a device body 61, an extracting portion 67 coupled to a lower portion of the device body 61, and an operation mechanism 70. The device body 61 includes: a mounting portion 63 having a tubular portion 62 enabling the device to be attached to or received in the bottle head portion and a body portion 64 integrally formed with the cylinder portion 62; and a fluid storage portion 65 coupled to a lower portion of the body portion and constituted of a container made of a transparent material. Further, a gas supply port 81 through which deterioration preventive gas is to be supplied into the device body 61 and an air vent valve 83 are provided in the body portion 64 (refer to FIGS. 1 and 4). The extracting portion 67, which is coupled to the device body 61 at an upper portion thereof, includes an operation mechanism 70, and an extraction pipe 74 is provided in a lower portion thereof. O-rings 8 as airtight maintaining means are interposed at the connecting portions, thereby enabling the prevention of leakage of deterioration preventive gas supplied from the gas supply port 81. An operation arm 72 is attached as a constituent member of the operation mechanism 70 at an intermediate position of the height of the extracting portion 67, and the up and down movement operation of this operation arm 72 enables a driving rod 75 constituting a later-described driving portion provided inside and the extraction pipe 74 to be moved upward and downward. The driving rod 75 enables the extraction of a fluid such as wine in the bottle from the extraction pipe 74 by the up and down movement operation of the operation mechanism 70.

Any kind of fluid can be a target of the extraction irrespective of the kind and property thereof, but here, wine is designated as a typical beverage, and gas mainly composed of nitrogen (hereinafter, referred to as "the N gas") is adopted as deterioration preventive gas. The reason why the N gas is adopted is that the gas is insoluble and inert to wine, which makes the gas suitable as gas for preventing quality deterioration of wine by blocking the contact between air and wine after bottle opening or at the time of wine extraction. The N gas is supplied to the fluid extracting device 60 in such a manner that a gas supply device 85 such as a gas bomb filled with the N gas is connected to the gas supply port 81 via a gas supply hose 86.

(Method of Using Fluid Extracting Device)

In a method of using the fluid extracting device, the arrangement of conditions under which the fluid in the bottle can be extracted is realized through the following three steps of preparatory works. As a first step, the existent cork stopper fitted in the bottle head portion B1 is pulled out in an atmosphere of deterioration preventive gas such as the N gas, and instead, a down-flow valve 7 is press-fitted therein (refer to FIGS. 2(a) and 4). This means that the down-flow valve 7 functions as a substitute stopper in place of the cork stopper. The down-flow valve 7 may be the one that has been mounted at a wine producer before shipment. As a second step, the fluid extracting device 60 is attached via the coupling assist 90 to the bottle head portion B1 having the down-flow valve 7 press-fitted therein. As a third step, the bottle B having the fluid extracting device 60 attached thereto is placed on a bottle setting table or the like (to be described later) installed at a wine bar or the like while the bottle is positioned upright or inclined at such an angle to allow the fluid to naturally flow down, and it is set so that the extracting device is positioned on a lower side of the bottle. Then, the operation mechanism 70 of the extracting portion 67 is operated, which makes it possible to extract a predetermined amount of the fluid when necessary while preserving freshness over a long period, under the state in which the quality deterioration of the fluid such as wine can be prevented by supplying the N gas into the fluid extracting device 60.

(Structure of Down-Flow Valve)

The down-flow valve 7 used as a down-flow valve here will be explained with reference to FIGS. 2a-2c. This down-flow valve 7 is, as shown in the drawings, a down-flow valve (plug with valve) having a discharge valve 7b in a body 7a and the structure thereof is as follows. The mushroom-shaped discharge valve 7b is inserted into an upper portion of the body 7a constituted of a tubular member having a flange portion, and a cap 7c is screwed to the upper portion for coverage, thereby preventing the valve from coming off. Further, an upper end portion of a compression spring 7d as a biasing member abuts on a lower face portion on a rear side of a head portion of the discharge valve 7b, so that airtight can be maintained when the head portion of the valve receiving a biasing force of the spring is in close contact with a seat hole 7i of the cap 7c. A lower end portion of the compression spring 7d is supported by a supporting member 7e screwed into an insertion hole of the body 7a. In passing, the strength of the biasing force of the spring 7d is adjustable by rotating the spring supporting member 7e to change the position thereof.

As shown in the drawings, in the vicinity of an upper portion of the down-flow valve 7, the body 7a of plug with valve and the cap 7c are screw-fixed, and an O-ring 7f as a packing is fitted to an upper portion of the flange portion to maintain airtight between the body 7a and the cap 7c. Rib portions 7g, . . . are formed inside the vicinity of an upper end portion of the body 7a at four places as shown in FIG. 2b, and the head portion of the discharge valve 7b is movable upward and downward in a state in which an outer peripheral portion thereof is in contact with these four rib portions. Therefore, when the head portion of the discharge valve 7b is pressed against the biasing force to be retreated, with an opening portion B2 of the bottle B facing downward, the fluid such as wine in the bottle B passes through spaces 7s formed between these rib portions and through a gap formed between the head portion and the seat hole 7i of the cap 7c, so that the fluid is allowed to flow out. In passing, since a portion lower than the flange portion of the down-flow valve 7 is to be press-fitted into the opening portion B2 of the bottle B, the outside diameter of the portion is made smaller than the diameter of the opening portion of the bottle by such an amount that O-rings 7k as seal members can be disposed between them in an elastic contact state.

By the way, since the inside diameter of the opening portion B2 of the bottle itself is diversified, it is difficult for the reason of cost to make the down-flow valve adaptable to all the inside diameters. Therefore, in the present invention, a down-flow valve as shown in FIG. 2c is adopted, this down-flow valve being so structured that the outer shape of the valve body is fixed and in place of the O-rings 7k, seal members 107k each constituted of a rubber ring having a T-shaped cross section are attached to a plurality of places of the body 107a. The seal members 107k are so structured that thick ring portions 107r on the inner side are fitted in grooves of the body 107a and airtight can be maintained by transformed portions 107m in a flange shape which are made by extending outer peripheral portions of the ring portions. Specifically, the seal members 107k are so structured that the portions 107m in a thin flange shape are transformed to fill a gap between the inner periphery of the bottle B and the outer periphery of the valve body 107a when the down-flow valve 107 is press-fitted into the bottle opening B2, thereby enabling the adaptation to wide variety of bottle sizes. The adoption of such a down-flow valve can reduce the kinds of plug sizes to be prepared, which can contribute to the reduction in running cost of wine bars or the like.

(Modification Example of Down-Flow Valve)

Explanation will be given with reference to FIGS. 9 to 13. A down-flow valve 111 includes a valve body 113, which has a hollow portion 112 (refer to FIG. 13), attachable to the bottle head portion B1, a discharge valve 114 capable of advancing and retreating in the hollow portion 112 relatively to the valve body 113, a coil spring (biasing member) 115 disposed in the hollow portion 112 to bias the discharge valve 114 in a direction of the fluid storage portion 65, and an abutted piece 119 having a down-flow hole 117 which is closed when the discharge valve 114 biased in the hollow portion 112 abuts thereon. The reference symbol 113p denotes a screw cap constituting a part of the valve body 113. The screw cap 113p is mainly intended for keeping the abutted piece 119 staying in the hollow portion 112 of the valve body 113. Ring-shaped elastic pleats 113a for enhancing airtight to the bottle are formed on an outer periphery of the valve body 113. Further, ring-shaped lip portion 118 protruding in a depth direction of the hollow portion 112 is provided on a periphery of the down-flow hole 117. The lip portion 118 is provided because the lip portion 118, when abutted on by the discharge valve 114, elastically transforms, thereby increasing the closed state between them. Moreover, a recessed portion 120 communicating with the hollow portion 112 is formed in an end portion of the valve body 113 in a direction of the fluid storage portion 65 (downward direction in FIG. 9), in other words, in an end portion of the screw cap 113p. The highest effect was obtained when the recessed portion 120 is formed in a fan shape with the dimension thereof gradually becoming smaller from an outer periphery toward an inner periphery of the end portion. Further, it is preferable to form at least one streak of vertical groove 121, preferably plural streaks, on an inner wall 113b surrounding the hollow portion 112 inside the hollow portion 112 from the abutted piece 119.

According to experiments conducted by the inventors, there are some cases when a fluid trying to flow down from the down-flow hole 117 stagnates at the down-flow hole 117 (lip portion 118) due to its surface tension and does not flow down, which is considered to be caused by the individual or correlative influence by the size and shape of the down-flow hole, viscosity of the fluid, pressure of the supplied deterioration preventive gas, and so on. A wine bottle whose bottle opening has an inside diameter of about 13.5 to 15 mm was used in the experiments, and the inside diameter of the down-flow valve (outside diameter of the hollow portion) used for this wine bottle was 10 to 12 mm. Specifically, when the inside diameter of the bottle opening in which the down-flow valve is press-fitted was reduced, the flow-down stagnation occurred. Then, when the down-flow valve 111 having the same structure and dimension as the above-described structure and dimension was used, it became possible to effectively prevent the stagnation of the fluid flowing down from the down-flow hole 117 of the abutted piece 119. Though specific causal relationship is not clear, it has been found out that the use of the down-flow valve 111 can prevent such stagnation of the fluid.

Figure 10:
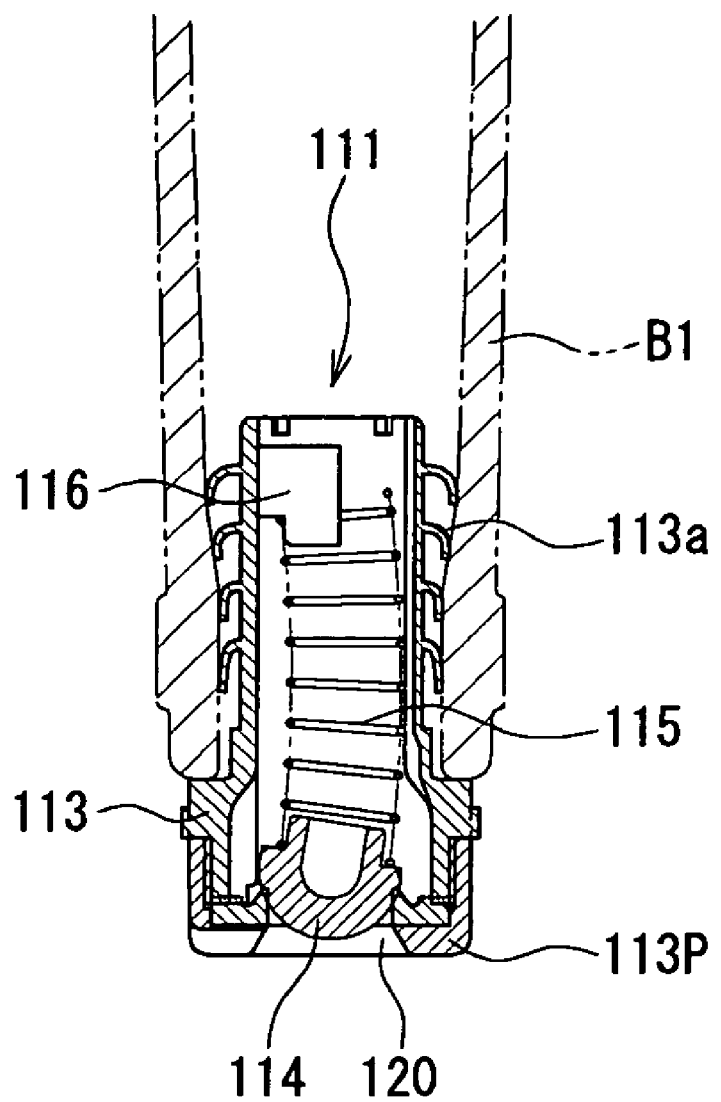
FIG. 10 is a cross sectional view showing the state in which the down-flow valve in FIG. 9 is attached to an opening portion of a bottle.
Figure 11:
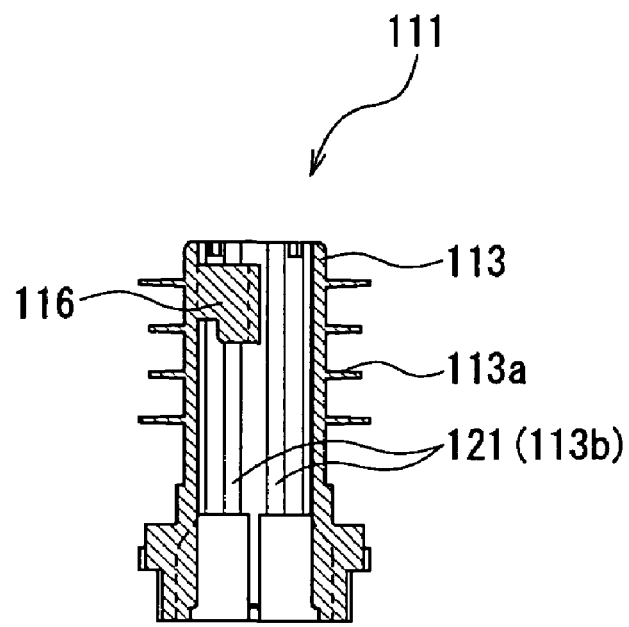
FIG. 11 is a cross sectional view showing a valve body constituting a part of the down-flow valve in FIG. 9.
Figure 12:
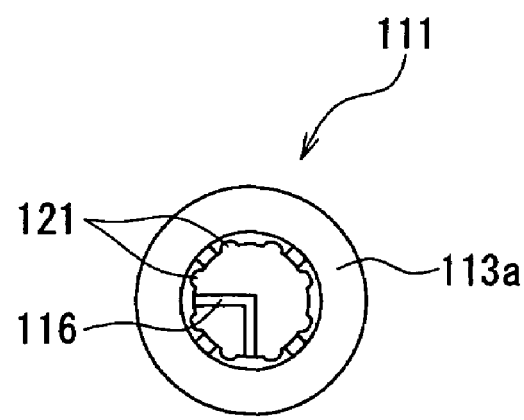
FIG. 12 is a top plan view showing the down-flow valve in FIG. 9.
Figure 13:
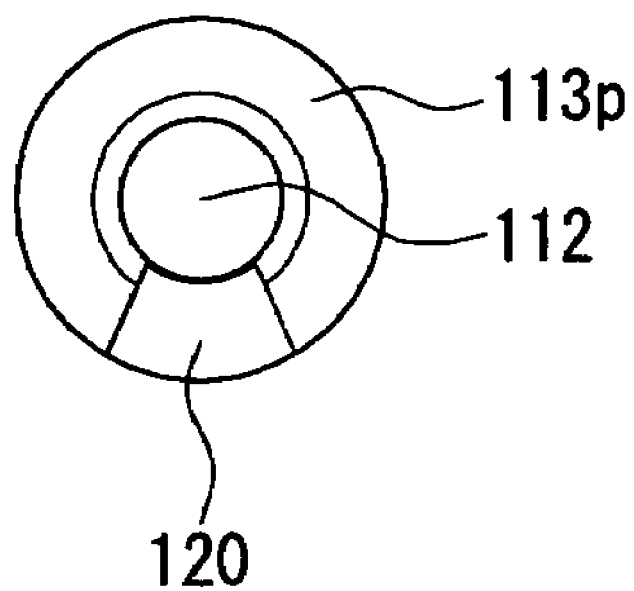
FIG. 13 is a top plan view showing a screw cap constituting a part of the down-flow valve in FIG. 9.

The coil spring 115 in the hollow portion 112 is so structured that one end thereof abuts on the discharge valve 114 and the other end abuts on a support piece 116 protruding into the hollow portion 112, respectively (refer to FIGS. 10 to 12). The support piece 116 is formed in a V shape extending in a radial direction from the center of the hollow portion 112 as shown in FIG. 12. The length of the coil spring 115 is set a little longer than the distance between the discharge valve 114 and the support piece 116, so that the coil spring 115 sandwiched by the discharge valve 114 and the support piece 116 is contracted. Further, since the support piece 116 abuts on the coil spring 115 only at a part of an end portion outer periphery thereof, the coil spring 115 as a result is put into an inclined posture, and the center axis thereof becomes to be nonlinear (refer to FIG. 10). Consequently, the pressure given to the abutted piece 119 via the discharge valve 114 becomes uneven on the periphery of the down-flow hole 117. This imbalanced load can be thought to be contributing to the prevention of the fluid stagnation. It has been experimentally confirmed that the prevention of the fluid stagnation can be realized with higher reliability by co-utilizing the imbalance caused by the coil spring 115.

(Concrete Structure of Fluid Extracting Device)

Next, the structure of the fluid extracting device will be explained in detail. The structure of the fluid extracting device in appearance was previously explained using FIGS. 1 and 3, and therefore, the internal structure thereof will be mainly explained here with reference to FIGS. 4 and 5. FIG. 4 shows the entire structure of the fluid extracting device 60 and FIG. 5 mainly shows in an enlarged state a portion of the extracting portion 67 to be described later. As shown in FIG. 4, this drawing shows the state when the fluid extracting device 60 is attached to the bottle head portion B1 via the coupling assist 90 and they are set with the bottle being placed upside down. The down-flow valve 7 being a plug with valve is press-fitted into the bottle head portion B1.

The fluid extracting device 60 includes the device body 61, the extracting portion 67, the operation mechanism 70, and other constituent elements. Both the fluid extracting device 60 and the bottle B are fixed by screw-connection with the coupling nut 91 of the coupling assist 90. However, if sufficient airtight is obtained between the cap 7c of the bottle B and the device body 61 without utilizing the coupling assist 90, the coupling assist 90 may be omitted.

The device body 61, which has a function as an airtight storage container, is constituted of a connected structure of the mounting portion 63 and the fluid storage portion 65 that is coupled to a lower portion thereof. The mounting portion 63 is constituted of the tubular portion 62 having the male thread portion on the outer peripheral portion thereof and the body portion 64 provided under the cylinder portion 62, both being integrally formed. The gas supply port 81, the air vent valve 83, and so on are provided in the body portion 64. The gas passage 64a (refer to FIG. 8) communicating with the gas supply port 81 is formed in the body portion 64. The air vent valve 83 allows air to be discharged therefrom when air inside the device body is initially replaced with the N gas, and also serves as a safety valve when the pressure inside the device body 61 becomes excessively high while the extracting device is in use after being set. Further, the air vent operation can also be conducted by pushing and opening an escape valve (not shown). However, the escape valve is not indispensable and may be omitted in a case when the pressure inside the device body 61 is not very high, a case when safety is ensured by other means, and the like. An upper half portion of the inside of the mounting portion 63 has a structure capable of housing a part of the head portion of the bottle B and a part of the down-flow valve 7.

(Structure of Fluid Storage Portion)

The fluid storage portion 65 formed in a circular container shape is provided under a lower portion of the body portion 64. It is preferable that the fluid storage portion 65 is made of a transparent material or a translucent material and the surface thereof has calibrations 65m for the indication of an amount of the stored fluid (refer to FIG. 3). The fluid storage portion 65 is connected and fixed to the lower portion of the body portion 64 via a flange portion 65a formed near an upper edge of the fluid storage portion 65 and a mounting ring 65b. In passing, the lower portion of the body portion 64 and the mounting ring 65b are coupled to each other by screw fixing, but an O-ring 8 as s packing is disposed between them, so that the airtight state of a joint between the body portion and the fluid storage portion 65 can be maintained.

Further, an outer peripheral portion of the fluid storage portion 65 is constituted of an upper portion corresponding to a portion serving as a storage chamber and a lower portion corresponding to a portion serving as a coupling portion, and the portion serving as the coupling portion is further formed in two steps, which are a large-diameter portion on an upper step and a small-diameter portion on a lower step. A male thread portion for attaching the later-described extracting portion 67 thereto is provided on an upper cylinder portion 65c on the upper step, and in a joining lower cylinder portion 65d, on the lower step, a female thread portion for attaching a later-described guide cylinder 68 thereto is provided on an inner peripheral portion. Further, in a range from an upper end portion of an inner peripheral portion of the fluid storage portion 65 to a predetermined depth position, a step is formed so as to make the inside diameter larger, and a rod guide 65e supporting an upper portion of the later-described driving rod 75 is fitted therein. This rod guide 65e acts through a guide hole provided at the center thereof so as to allow an upper end portion (first driving portion) 75g of the driving rod 75 to accurately press the discharge valve 7b of the down-flow valve 7. The fluid storage portion 65 is formed in a container shape, and an inner bottom portion thereof is formed in a truncated cone shape having gentle inclination angle, and a down-flow hole portion 65f for allowing the fluid stored in the fluid storage portion to flow down to the extracting portion 67 disposed downward is provided at a center portion of the inner bottom portion.

(Structure of Extracting Portion)

The extracting portion 67 constituted of a cylindrical body having a tapered external appearance is coupled to the lower portion of the fluid storage portion 65. The extracting portion 67 is fixed in such a manner that an upper inner peripheral portion of an outer cylinder 67a is screw-connected to the lower cylinder portion 65d positioned in the lower portion of the fluid storage portion 65. An inner cylinder 67b is fitted in an inner peripheral face of the outer cylinder 67a, and the inner cylinder 67b is supported on a step formed at a lower end of the outer cylinder 67a. An upper end portion is disposed so as to be in contact with a lower face of the step of the large-diameter portion of the fluid storage portion 65.

Figure 5:
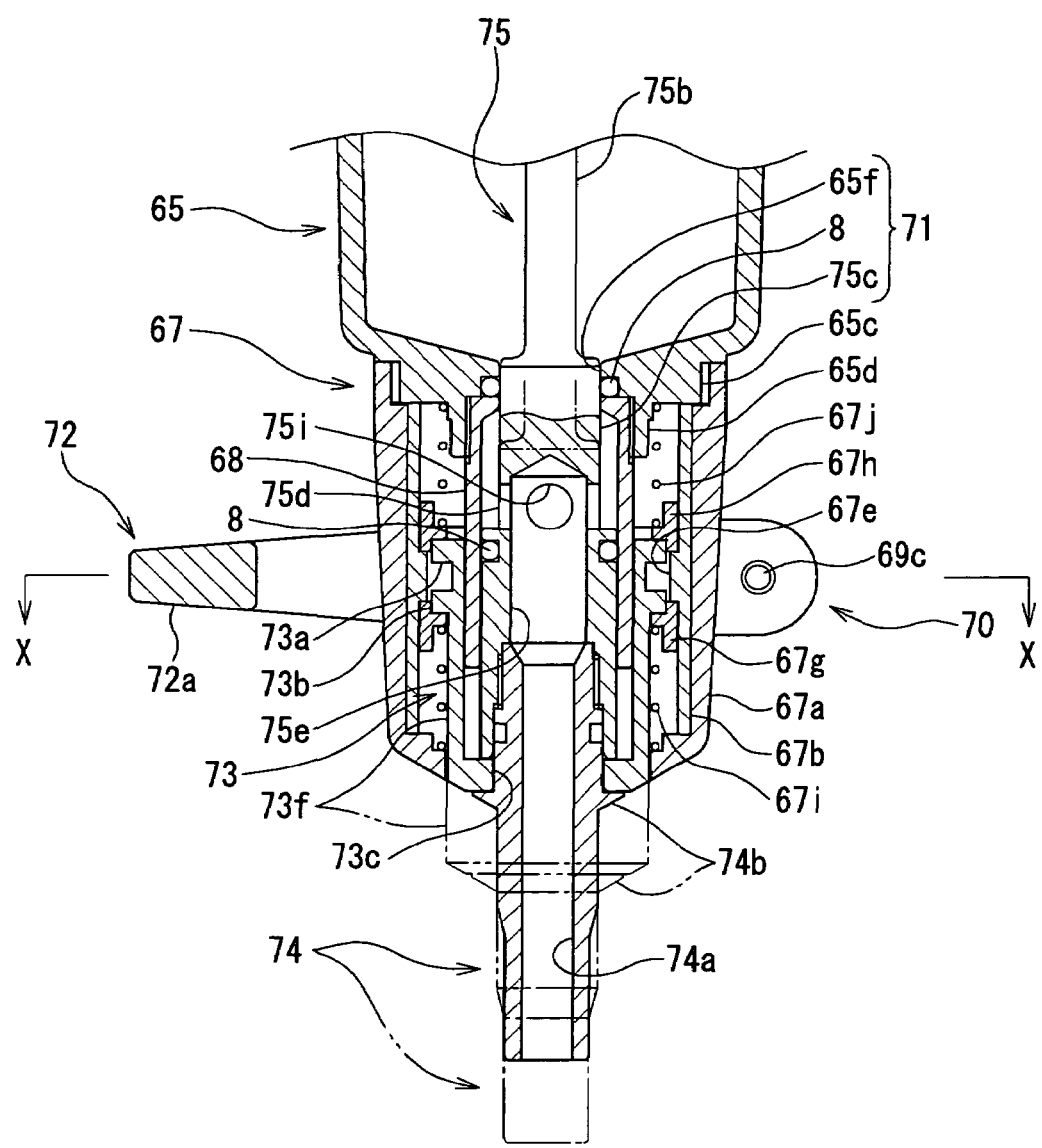
FIG. 5 is an enlarged sectional view of the main portion of the fluid extracting device.

The extracting portion 67 includes the operation mechanism 70, which enables the extraction of the fluid stored in the fluid storage portion 65 under the airtight state. As shown in FIG. 5, a wide protruding portion 67e is formed in an intermediate height portion of an inner peripheral portion of the inner cylinder 67b. The guide cylinder 68 constituted of a bottomed cylindrical member with an opening portion thereof facing downward is coupled and fixed to the center of the inside of the extracting portion 67 in such a manner that an upper outer peripheral portion is screw-connected to an inner peripheral portion of the lower cylinder portion 65d. The O-ring 8 as an airtight maintaining means is disposed between the lower portion of the fluid storage portion 65 and the guide cylinder 68, so that the fluid or the N gas is prevented from leaking outside.

An up and down movement member 73 in a container shape constituted of a bottomed cylindrical member is fitted to be able to move upward and downward to an outer peripheral portion, which is a substantially lower half of the outer peripheral portion, of the guide cylinder 68. The up and down movement member 73 is so structured that two lines of flange-shaped projecting portions 73b are provided at a predetermined interval on an outer periphery upper end portion thereof, resulting in the formation of a groove 73a between the projecting portions, and a hole portion 73c to which the extraction pipe 74 is able to insert is provided at a lower end center portion thereof. Outer peripheral portions of two lines of the projecting portions 73b are in contact with an inner peripheral portion of the wide protruding portion 67e formed in the middle of the inner peripheral portion of the inner cylinder 67b, and are able to slide relatively to the inner peripheral portion of the wide protruding portion 67e. An upper convex ring 67h and a lower convex ring 67g are provided above and below the wide protruding portion 67e respectively, and protruding portions formed on inner peripheral portions thereof abut on upper and lower faces of the aforesaid two projecting portions respectively. The lower convex ring 67g provided below the projecting portions 73b is biased upward by a lower compression spring 67i. The upper convex ring 67h provided above the projecting portions 73b is biased downward by an upper compression spring 67j. These two compression springs have the same spring constant so as to constantly keep the up and down movement member 73 positioned in a balanced state.

As shown in FIG. 4, the driving rod 75 including the first driving portion for driving the down-flow valve (substitute stopper) 7 and the second driving portion for driving the extraction valve is provided upright in a range from the inside of the fluid storage portion 65 to the lower portion of the extracting portion 67. The driving rod 75 is so structured that a portion thereof positioned in the fluid storage portion 65 is constituted of a small-diameter portion 75a, an intermediate-diameter portion 75b, and a large-diameter portion (large-diameter rod portion) 75c. The small-diameter portion 75a enters into the hole portion of the rod guide 65e provided in the upper portion of the fluid storage portion 65. The upper end portion 75g of the small-diameter portion 75a of the driving rod 75 serves as the first driving portion. When the driving rod is moved upward, guided by the rod guide 65e, it pushes up the discharge valve 7b of the down-flow valve 7, so that the valve can be opened.

As shown in FIG. 5, the extraction valve 71 is constituted of the large-diameter portion (second driving portion) 75c of the driving rod 75, the down-flow hole portion 65f, and the O-ring 8 serving as a packing. When the large-diameter portion 75c of the driving rod 75 is in a neutral state or at a position higher than this state, it is inserted into the down-flow hole portion 65f provided in the lower portion of the fluid storage portion 65, so that the fluid in the fluid storage portion 65 cannot flow down. On the other hand, when the driving rod 75 moves downward from the position, the large-diameter portion 75c becomes apart from the down-flow hole portion 65f, resulting in an open state of the hole portion, so that the fluid in the fluid storage portion can flow down into the guide cylinder 68 therefrom. Of course, since the first driving portion 75g (refer to FIG. 4) is in a lowered state at this time, the discharge valve 7b of the down-flow valve 7 is in a closed state due to the biasing force of the bias spring. Since the O-ring 8 is provided at the down-flow hole portion 65f, the inside of the fluid storage portion 65 and the inside of the extracting portion 67 are kept airtight while the large-diameter portion 75c is positioned here.

A lower half portion of the driving rod 75, that is, a portion positioned in the extracting portion 67, is substantially the extension of the large-diameter portion 75c to be an introducing portion 75d in a cylindrical shape having an extraction hole therein. Four introducing holes 75i (only one hole is shown) directed toward the center are provided in a cylinder portion of the introducing portion 75d, so that the fluid introduced into the guide cylinder 68 can be introduced to the extraction hole provided inside. A joint member 75e fitted in a lower inner peripheral portion of the guide cylinder 68 is coupled to a lower end portion of the introducing portion 75d integrally with the guide cylinder 68. The O-ring 8 as an airtight maintaining means is disposed between an outer peripheral portion of this joint member 75e and an inner peripheral portion of the guide cylinder 68, thereby maintaining the airtight state and preventing the fluid entering the guide cylinder from dropping.

The extraction pipe 74 is connected to a lower portion of the joint member 75e. The extraction pipe 74 is made of a tubular member so structured that the outside diameter of an upper portion thereof is made slightly larger than the outside diameter of a lower portion thereof, and a fluid outflow port 74a is provided therein so as to vertically pass through. Further, the extraction pipe 74 is connected to the joint member 75e in such a manner that a male thread portion provided on an upper outer peripheral portion of the extraction pipe 74 and a female thread portion provided on a hole portion of the joint member are screw-connected. Further, a lower face of a bottom portion formed in a lower end portion of the up and down movement member 73 is restrained by a collar portion 74b formed on an outer peripheral portion of the extraction pipe 74, and an upper face thereof is restrained by a lower end portion of the joint member 75e. Accordingly, by means of the operation of the operation mechanism 70, the up and down movement member 73, the extraction pipe 74, the driving rod 75, the joint member 75e, and so on are able to move upward and downward as one unit.

Figure 6:
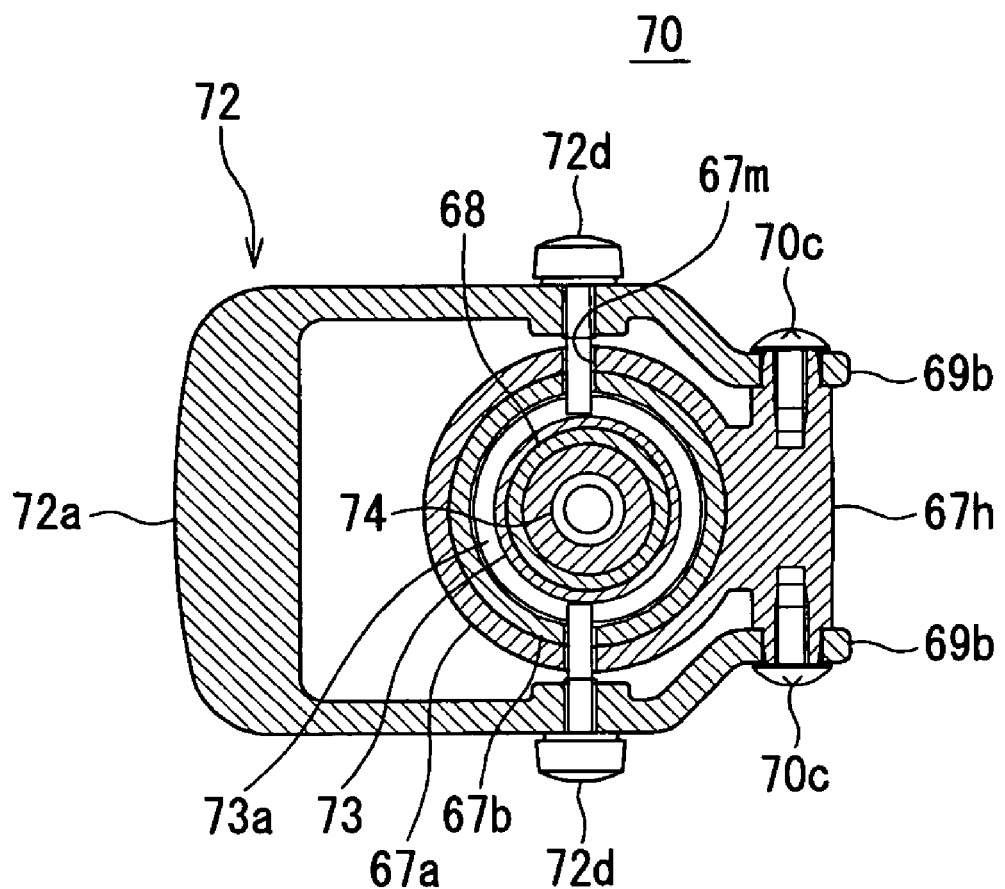
FIG. 6 is a cross sectional view taken along the X-X line in FIG. 5, showing an operation mechanism of the fluid extracting device.

The operation arm 72 constituting the operation mechanism 70 is attached to an intermediate height portion of the extracting portion 67. As shown in FIGS. 3 and 6, the operation arm 72 is so formed that both arms of an arm portion 72a in a bifurcated shape embrace the outer cylinder 67a, and a tip portion thereof is supported via fulcrum pins 70c to a mounting projecting portion 67h provided so as to project from an outer peripheral portion of the outer cylinder 67a. Swing pins 72d are inserted into the respective arm portions 72a at intermediate positions of the length thereof. The swing pin 72d has a male thread portion on a portion under a neck of a faced head portion, and a straight portion ahead thereof. The portion being the male thread portion of the swing pin 72d is screwed toward the inside from a side portion of the arm portion 72a, and the straight portion passes through arc-shaped grooves 67m (refer to FIGS. 1 and 3), which are provided in the outer cylinder 67a and the inner cylinder 67b, to reach the groove 73a of the up and down movement member 73 (refer to FIG. 6). Therefore, the up and down movement member 73 can move upward and downward by means of the swing pins 72d when the arm portion 72a is swung, thereby allowing the driving rod 75, the extraction pipe 74, and so on to move upward and downward. Incidentally, as the driving rod 75, the one that is formed as a single member is explained in this embodiment, but, with the adoption of, for example, a driving rod that itself has a dual pipe structure, the up and down movement operation can be conducted separately for the down-flow valve and the extraction valve.

(Method of Operating Fluid Extracting Device)

Next, the operation of the fluid extracting device will be explained. Under the state in which the fluid extracting device 60 is mounted on a setting table or the like as shown in FIGS. 3 to 5, the fluid in the bottle B cannot flow down since the discharge valve 7b of the down-flow valve 7 is closed. The operation of the fluid extracting device includes, firstly, a work of replacing air in the device body 61 with the N gas. This operation is performed by opening the air vent valve 83 while supplying the N gas from the gas supply port 81 (refer to FIG. 1) and keeping this state for several seconds. When the air vent valve 83 is closed thereafter, the inside of the fluid storage portion 65 is brought into the state filled with the N gas.

Next, when a free end side of the arm portion 72a of the operation arm 72 is lifted, the tip portion of the driving rod 75 pushes up the discharge valve 7b of the down-flow valve 7, so that the fluid in the bottle flows down into the fluid storage portion 65. Also in this state, the large-diameter portion 75c of the driving rod 75 as the extraction valve is fitted in the down-flow hole portion 65f in the lower portion of the fluid storage portion 65 to produce a closed state under the state in which airtight is maintained via the mechanism of the extracting portion 67. Therefore, the fluid flowing down into the fluid storage portion 65 does not flow down from the extraction valve to the extracting portion 67. Thus, the fluid in the bottle keeps flowing down while the operation arm 72 is kept lifted, so that the fluid in the fluid storage portion 65 keeps increasing until the fluid storage portion 65 is fully filled. If the N gas is continuously supplied also during the operation, the N gas small in specific gravity goes up from the inside of the fluid storage portion 65 in place of the fluid to fill the space produced in the bottle by the flow-down of the fluid, so that there remains no room in the bottle for air to enter.

Figures 2A, 2B:
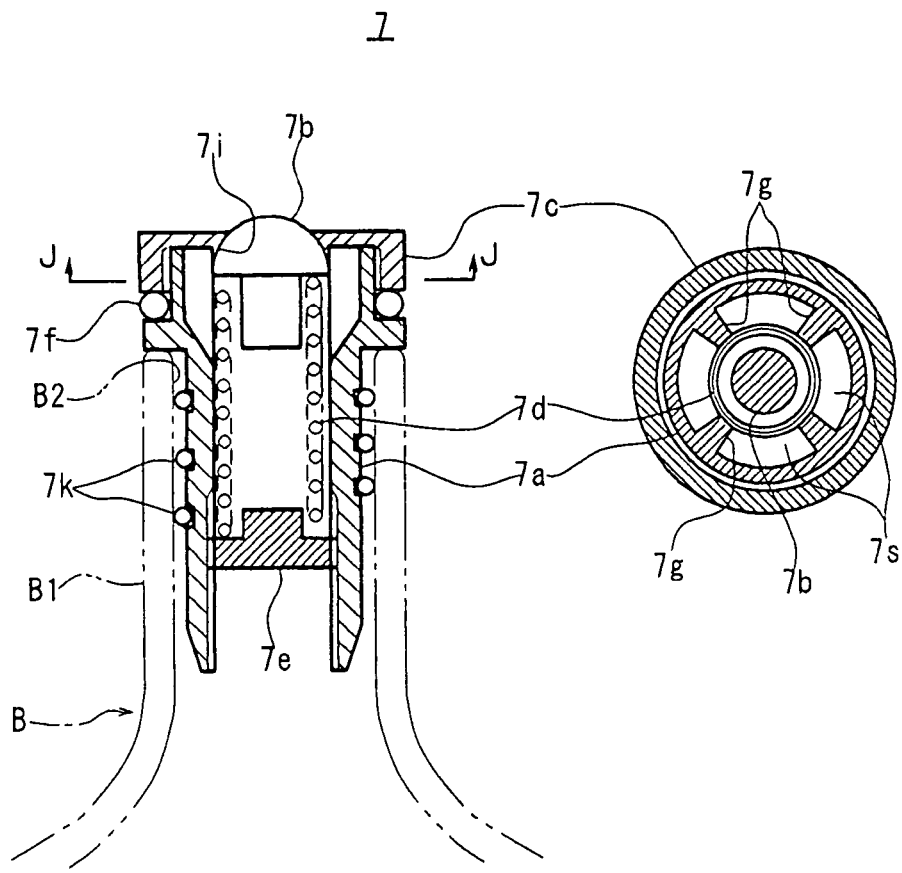
FIGS. 2a-2c are cross sectional views of a down-flow valve (substitute stopper) to be attached to a bottle.
Figure 2C:
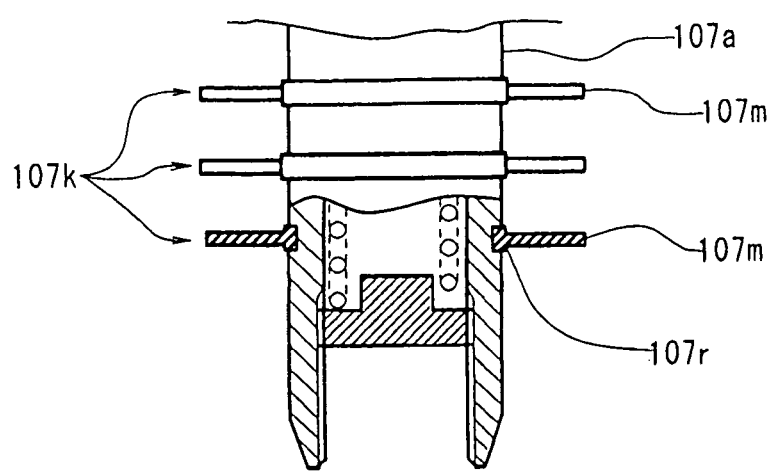

Next, the flow-down operation of the fluid is continued under the eye-observation of the calibrations 65m (refer to FIG. 3) of the fluid storage portion 65, and when the operation arm 72 is returned to the neutral position at an instant when the fluid reaches a predetermined amount, the first driving portion 75g moves downward, so that the discharge valve 7b of the down-flow valve is brought into close contact with the seat hole 7i due to the biasing force of the compression spring 7d to stop the flow-down of the fluid (refer to FIG. 2a). Also at this time, the N gas is similarly filled in place of the fluid in the space which is made after the discharge of the fluid, and therefore, no deterioration of fluid quality occurs since only the fluid and the N gas exist in the bottle, even when the discharge valve 7b is closed. Incidentally, as for setting of the bottle, the upright setting is not indispensable as long as it is so inclined to allow the inside fluid to naturally flow.

Next, when the arm portion 72a of the operation arm 72 is pushed down, the large-diameter portion 75c of the driving rod 75 is made apart from the down-flow hole portion 65f of the fluid storage portion 65 by the operation mechanism 70 as shown by the two-dot chain line in FIG. 5, so that the fluid stored in the fluid storage portion flows down into the guide cylinder 68 through this down-flow hole portion. The fluid flowing down into the guide cylinder 68 is further led to the inside of the introducing portion 75d having the extraction hole therein and flows into the extraction hole from the introduction hole 75i provided in the cylinder portion of the introducing portion. Then, the fluid which has passed through the extraction hole further passes through the inside of the joint member 75e to be extracted to the outside through the fluid outflow hole 74a of the extraction pipe 74. At this time, the fluid is easily poured to a glass or the like since a lower portion 73f of the up and down movement member 73 protrudes downward from a lower end portion of the outer cylinder 67a as shown by the two-dot chain line. Incidentally, the extraction of the fluid from the extraction pipe 74 is continued under this state, but when the arm portion 72a is returned to the neutral position at the completion of the discharge of the whole fluid in the fluid storage portion 65, the elements which have been moved downward by the operation mechanism 70 return to the neutral position. When the fluid such as wine is to be extracted again next, wine or the like kept fresh can be extracted anytime by a similar operation of the operation mechanism.

The foregoing explanation was made on the premise that the fluid is wine and the deterioration preventive gas is a gas mainly composed of nitrogen (the N gas). But, as the deterioration preventive gas, other gases such as a carbon dioxide gas, a mixed gas of a nitrogen gas and a carbon dioxide gas, and other gases are adoptable. For example, in the case of a carbonated beverage, the adoption of a carbon dioxide gas as the deterioration preventive gas enables, in addition to the prevention of fluid deterioration, the prevention of loss of a carbonic acid component. Further, the fluid may be other beverages such as whiskey, brandy, a carbonated beverage, a nutritional supplement, a dairy product, fruit juice with pulp, condensed fluid, fluid high in fluid drag, and so on. But, needless to say, the selection of the deterioration preventive gas is different depending on the nature of the fluid, and in addition, the fluid extracting device needs to have the structure adaptable thereto.

Figure 7:
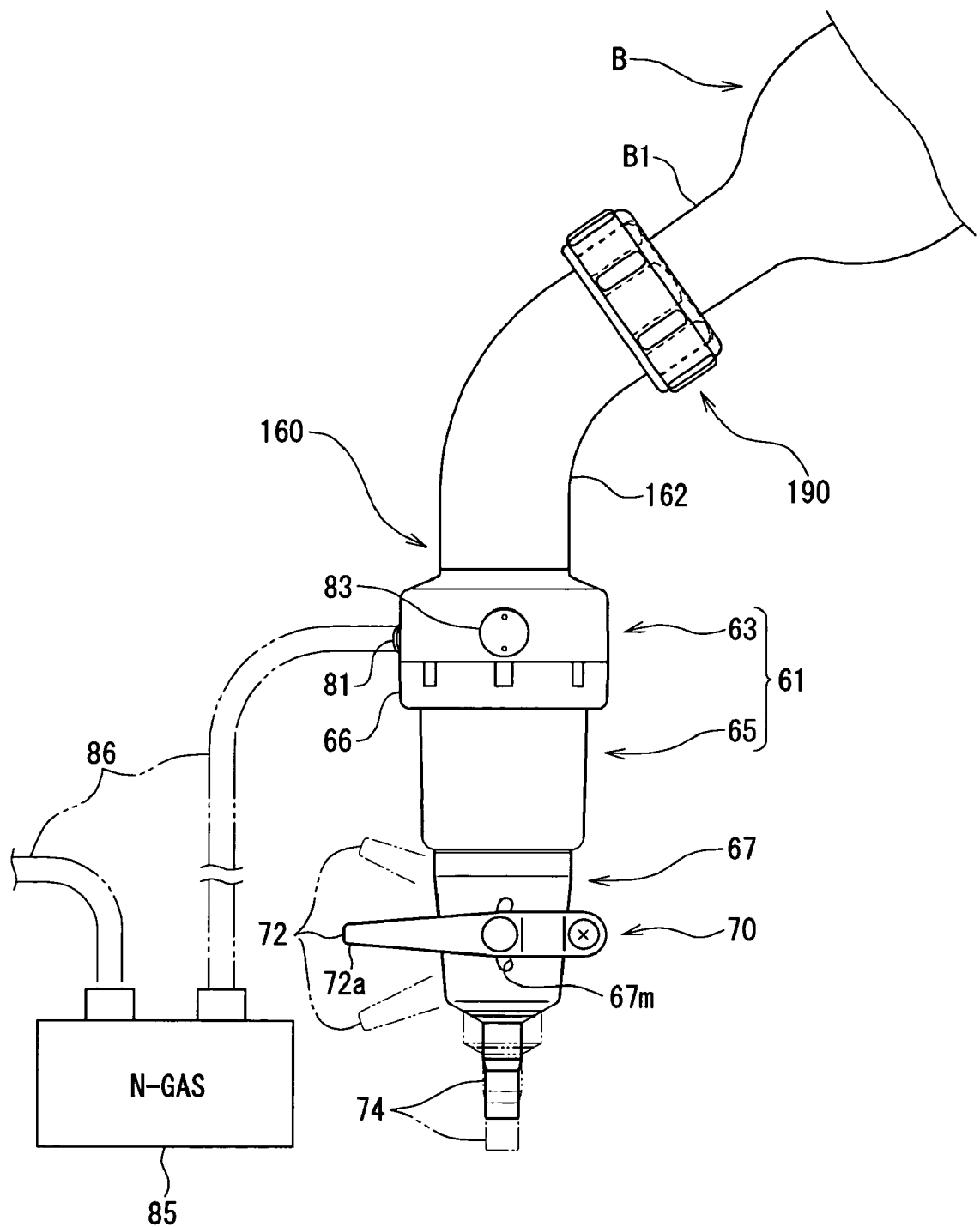
FIG. 7 is a front view of another example of the fluid extracting device.

As for the posture of the bottle to which the fluid extracting device is attached, it is generally set upright as shown hitherto in the drawings, but the bottle may be set, for example, in a tilted posture so as to make a label or the like of the bottle impressive as shown in FIG. 7. Specifically, such a structure may be adopted that the length of a cylinder portion 162 of a mounting portion of a fluid extracting device 160 is made long and is constituted of a flexible member, and a bottle is coupled to a tip portion thereof via a coupling assist 190. In FIG. 7, the structure of the fluid extracting device 160 is similar to that of the fluid extracting device 60, but since the above-described structure of the first driving portion for driving the down-flow valve is incompatible, a flexible rod is adopted or a mechanism driven by a different operation from that of the second driving operation is adopted. In passing, the same reference numerals and symbols as those in FIG. 1 are used for other structures in the drawing.

(Modification Example of Fluid Storage Portion)
(Structure of Automatic Quantifying Device of Fluid Storage Portion)

Figure 8:
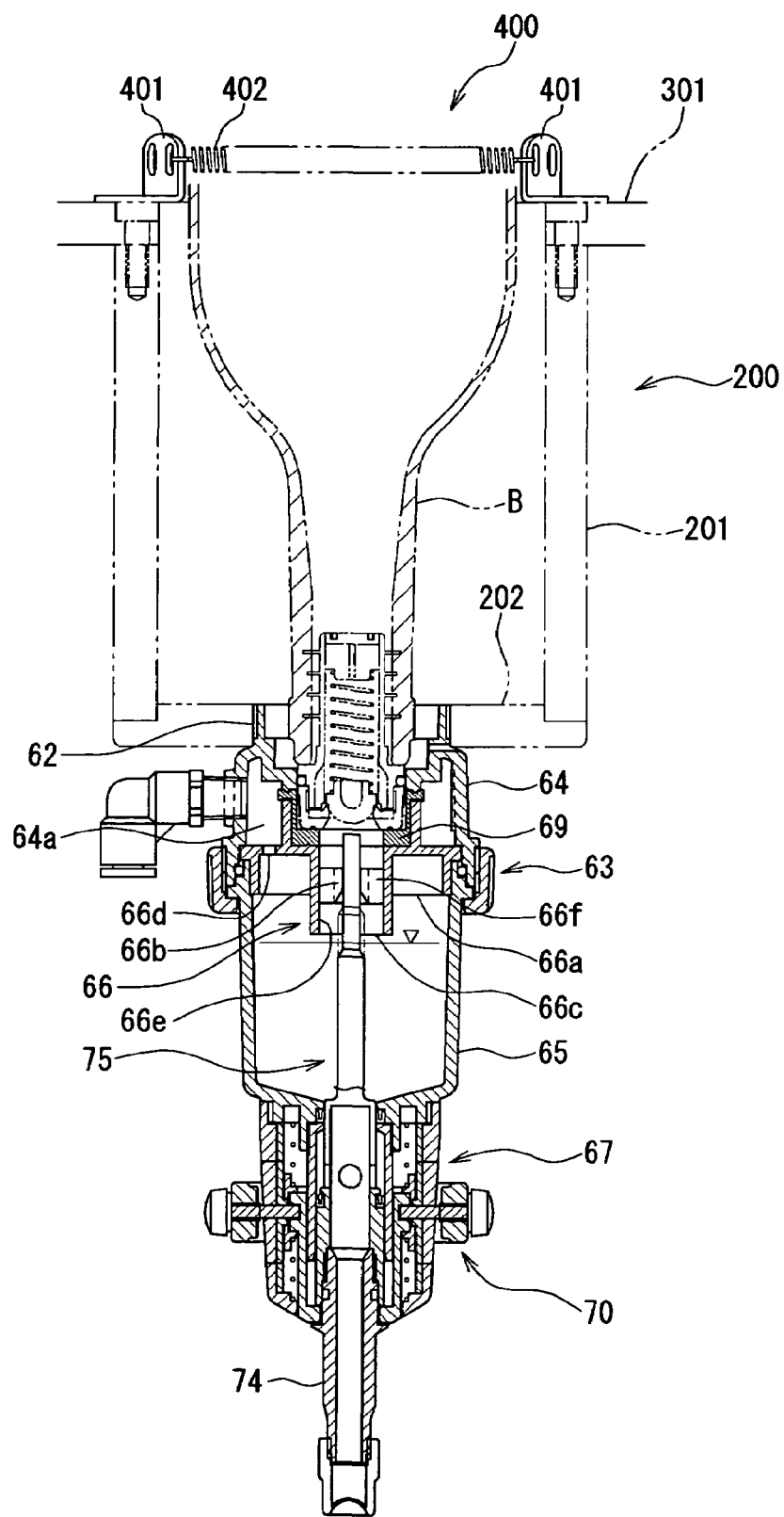
FIG. 8 is a cross sectional view of a modification example of the fluid extracting device, which includes an automatic quantifying device.
Figure 9:
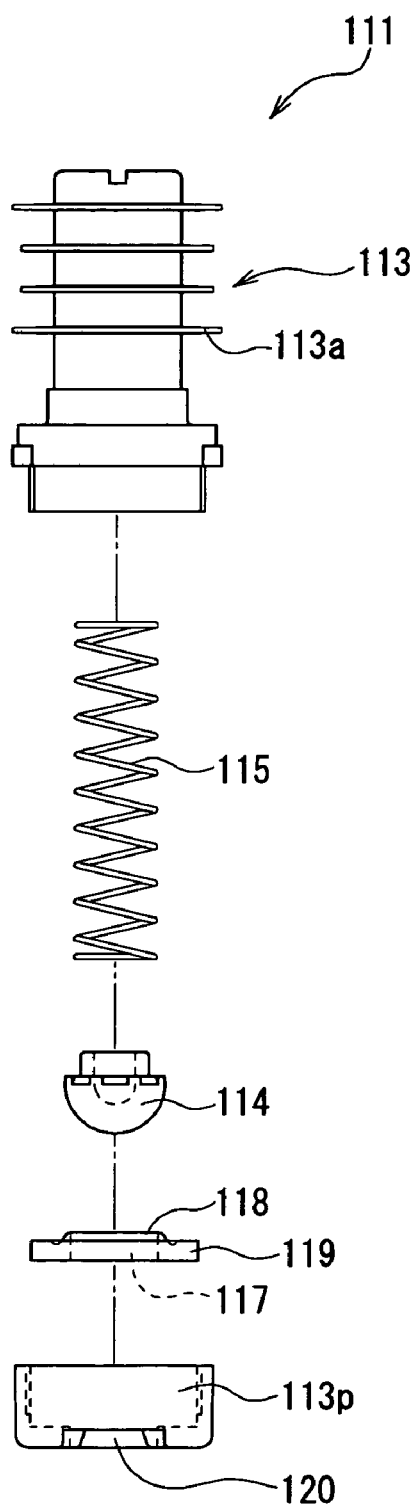
FIG. 9 is an exploded view showing a modification example of the down-flow valve used in relation to the fluid extracting device.

Next, as for the fluid storage portion 65, the explanation in the above-described embodiment was made on the fluid storage portion 65 formed as the transparent material or the translucent material and having on the container-shaped surface thereof the calibrations 65m for the indication of an amount of the stored fluid, but in this modification example, an automatic quantifying device structured to be capable of automatically supplying a fixed amount of a fluid as shown in FIG. 8 will be explained instead of the graduated fluid storage portion 65. In passing, those denoted by the same reference numerals and symbols as those in the above-described embodiment mean that they are the same members as those of the embodiment.

As shown in FIG. 8, an automatic quantifying device 66 is disposed in an upper portion of the fluid storage portion 65, and the body portion 64 is disposed on an upper portion of the automatic quantifying device 66 via a gasket 66. The automatic quantifying device 66 is constituted of a rod bearing body 66a having an inner bearing 66b, a ring-shaped projecting portion 66c, a gas supply passage 66d, an inside diameter portion 66e, and rib portions 66f. The inner bearing 66b and the inside diameter portion 66e are integrally connected by the ribs 66f formed in radial, and passages are formed between the inside diameter portion 66e and the inner bearing 66b connected to each other by the ribs 66f. Therefore, the inside diameter portion 66e is formed in order to constitute down-flow passages that allow the fluid such as wine to flow down from the bottle to the fluid storage portion 65. The inside diameter portion 66e constituting the down-flow passages is isolated from the gas passage 64a formed in the body portion 64, so that the gas passage 64a formed in the body portion 64 is shielded by the rod bearing body 66a. In this structure, the N gas is supplied to the inside diameter portion 66e constituting the down-flow passages and to the fluid storage portion 65 via the gas supply passage 66d from the inside of the body portion 64. Further, an orifice is disposed in the gas supply passage 66d. As for the gas supply passage 66d, the gas supply passage 66d itself may be formed as an orifice hole without the orifice disposed therein so that the gas supply passage 66d is provided to have a throttle effect to the supplied gas. In this case, the disposition of the orifice can be omitted.

The rod bearing body 66a bears the driving rod 75 by the inner bearing 66b. The inside diameter portion 66e constituting the fluid passages from the bottle B is formed on a center side of the rod bearing body 66a, and on an inner side of the inside diameter portion 66e, the inner bearing 66b connected thereto by the ribs 66f formed in radial is provided integrally. The inner bearing 66b of the rod bearing body 66a bears to be able to slide the small diameter portion 75a of the driving rod 75. The ring-shaped projecting portion 66c formed by the extension of the inside diameter portion 66e is provided on a lower face of the rod bearing body 66a. In passing, the rod bearing body 66a has a function as a partitioning cover for shielding between the fluid storage portion 65 side and the body portion 64 side to which the down-flow valve 7 for the bottle B is attached. Therefore, it is different from the rod guide 65e shown in FIG. 4 explained in the aforementioned embodiment in that the rod bearing body 66a has such a shielding function. In other words, since the rod guide 65e is intended for bearing to be able to slide the small-diameter portion 75a of the driving rod 75, the interval of a gap between the body and the bearing portion connected to each other by ribs of the rod guide 65e is formed to be large. Therefore, when the fluid such as wine flows down to the fluid storage portion 65 via the down-flow valve 7 in the bottle B, the fluid sometimes scatters across the gap of the rod guide 65e to contaminate the inside of the body portion 64 of the device body 61. In order to remove the contamination, it is often necessary to detach the fluid storage portion 65 and the rod guide 65e from the device body 61 to wash the inside of the device body 61, but the rod bearing body 66a having the shielding structure prevents the scattering into the body portion 64, which provides an advantage of eliminating the trouble of frequent washing or the like.

The orifice or orifice hole 66d is intended for giving a drag to the gas pressure by throttling a flow amount supplied through the orifice or orifice hole 66d at the time of supplying the N gas into the fluid storage portion 65 from the gas passage 64a formed in the body portion 64 of the fluid extracting device 60, thereby making the discharge of wine or the like slow at the end of the discharge in order to prevent such a situation that the gas pressure blows out to cause the scattering of wine or the like in splash at the end of the discharge of the fluid such as wine, the scattering being caused if the fluid such as wine is discharged at a time when it is discharged from the fluid storage portion 65 to the extraction pipe 74. In passing, a filter is attached to a tip of the extraction pipe 74 in FIG. 8 and the filter is a cap for removing dregs of wine or the like.

In the automatic quantifying device 66, when the storage level of the fluid storage portion 65 is raised by the flow-down of the fluid from the bottle B to reach the ring-shaped projecting portion 66c, an opening of the ring-shaped projecting portion 66c is closed by the fluid to automatically stop the flow-down of the fluid from the bottle B. This is because the N gas in the fluid storage portion 65 cannot enter the ring-shaped projecting portion 66c by the closing of the opening, so that it does not reach the inside of the bottle B. Specifically, when the fluid flows down from the bottle B, the pressure inside the bottle B lowers by a corresponding amount, and the flow-down of the fluid is continued when the N gas, if it enters, compensates the reduction amount of the pressure, but since the N gas cannot enter, the flow-down of the fluid is stopped.

Therefore, as for the flow-down of the fluid, when the free end side of the arm portion 72a of the operation mechanism 70 is lifted (refer to FIG. 5), the discharge valve 7b of the down-flow valve 7 opens to cause the fluid in the bottle B to flow down into the fluid storage portion 65, but when the fluid flowing down reaches the opening of the ring-shaped projecting portion 66c, an amount of the fluid is fixed in the fluid storage portion 65 even if the operation arm is kept lifted, so that the flow-down is automatically stopped. This eliminates the trouble of operating the operation arm under the monitoring of the flow-down motion of the fluid by an eye-observation of the calibrations 65m of the fluid storage portion 65 (refer to FIG. 3).

(Structure of Mounting Fluid Extracting Device on Display Table or the Like)

In FIG. 8, a bottle holder 200 in relation to the fluid extracting device 60 is shown by a virtual line. The bottle holder 200 is composed of a tubular portion 201 in a cylindrical shape and a bottom portion 202 in which an insertion hole is formed at the bottom center thereof. The cylinder portion 62 of the body portion 64 of the fluid extracting device 60 is inserted into the insertion hole of the bottom portion 202 and is, for example, screwed to the insertion hole to be fixed to the bottom portion 202.

In order to realize the connection of the body portion 64 to the bottom portion 202 of the bottle holder 200, the opening portion of the bottom portion 202 is so formed to allow the body portion 64 to be directly screwed thereto. With such a structure that the body portion 64 is thus directly connected to the bottom portion 202 of the bottle holder 200, it is possible to detach the fluid storage portion 65 by releasing the screw connection of the mounting portion 63, which facilitates washing and so on to enable good sanitary control. The bottle of wine or the like is inserted to the bottle holder 200 in the upside down state with the opening portion thereof facing downward and is kept upright. Incidentally, the tubular portion 201 of the bottle holder 200 is not limited to that in a cylindrical shape but may be, for example, in a rectangular shape.

An upper portion of the bottle holder 200 is fixed to a table plate 301 of a display table such as a wagon by an appropriate fixing means. In the drawing, the installation state with one fluid extracting device 60 is shown for the convenience of explanation, but the fluid extracting devices 60 may be arranged in plurality or in a plurality of lines on the table plate 301.

(Clamp Structure)

Figure 14:
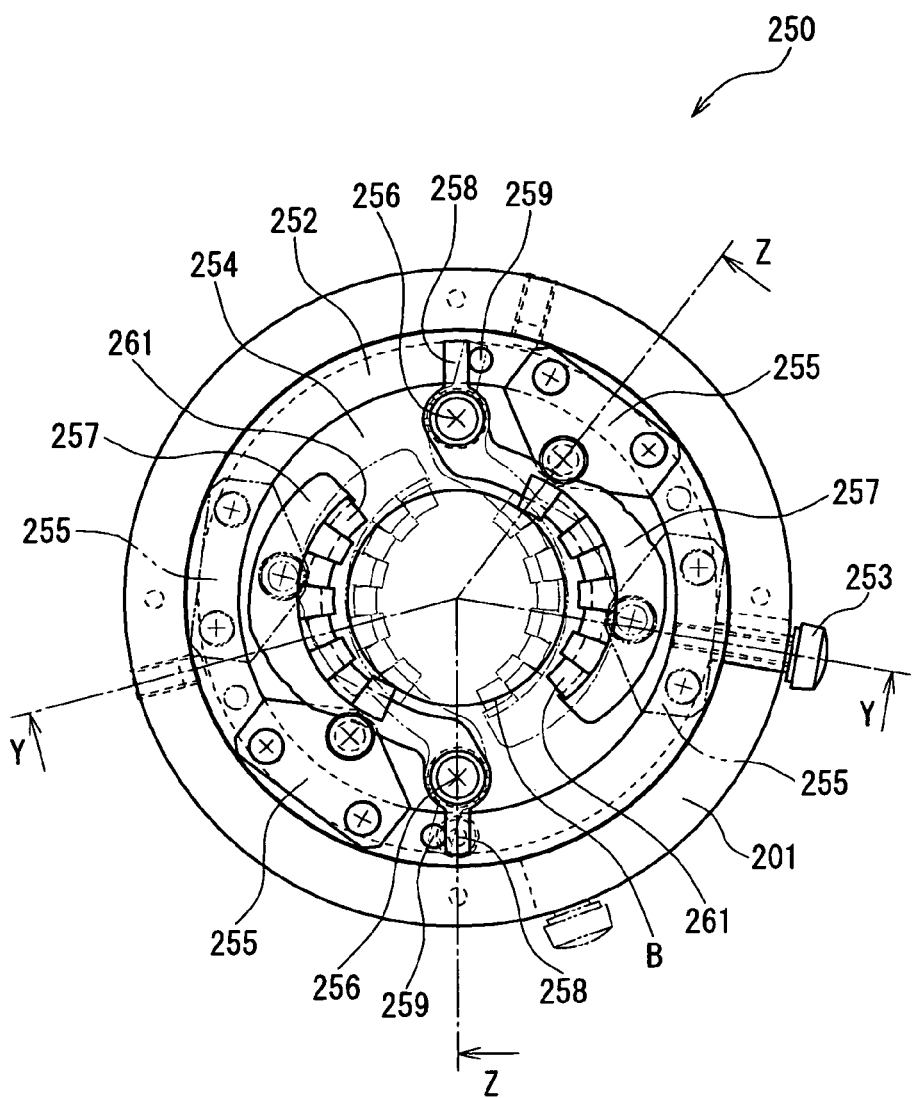
FIG. 14 is a top plan view showing the constitution of a clamp structure used in relation to the fluid extracting device.
Figure 15:
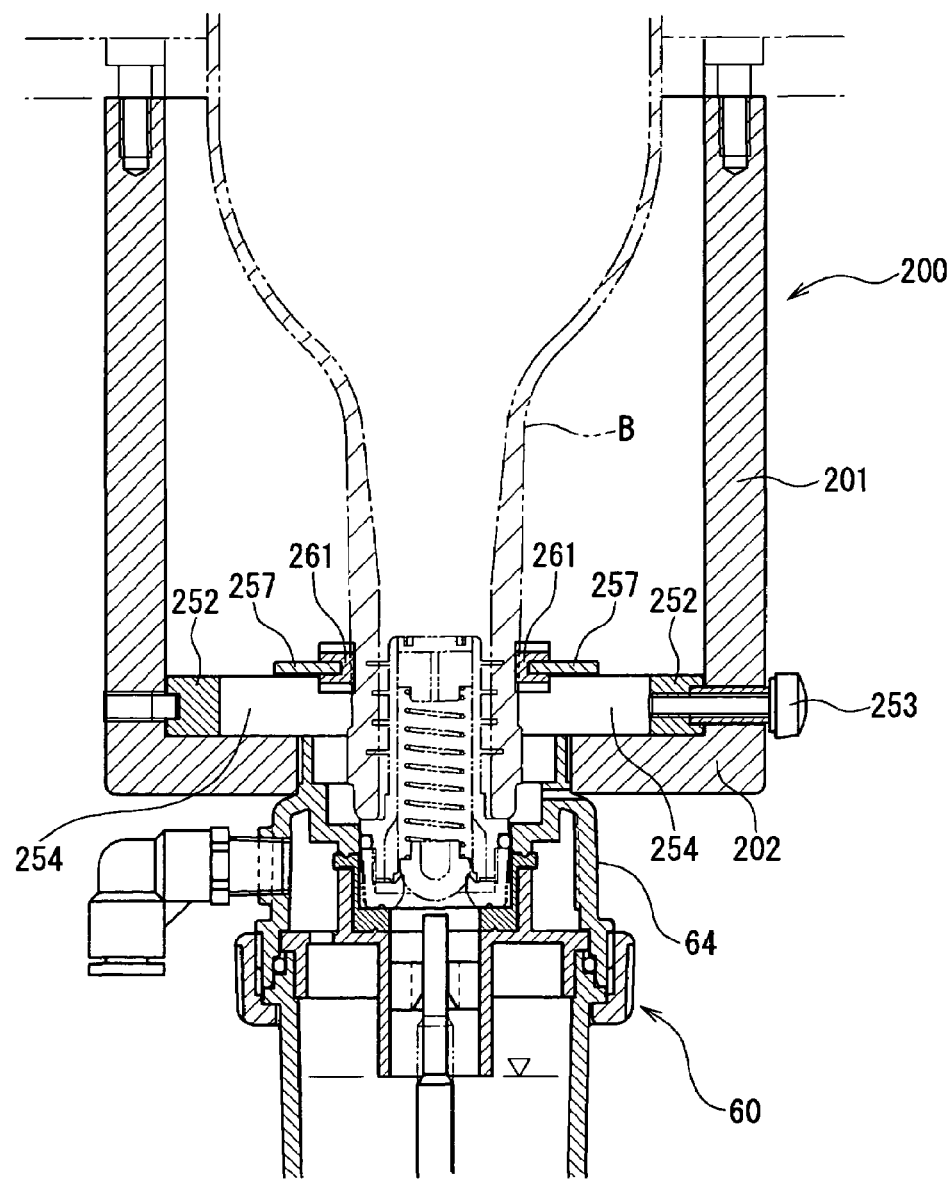
FIG. 15 is a cross sectional view taken along the Y-Y line in FIG. 14.
Figure 16:
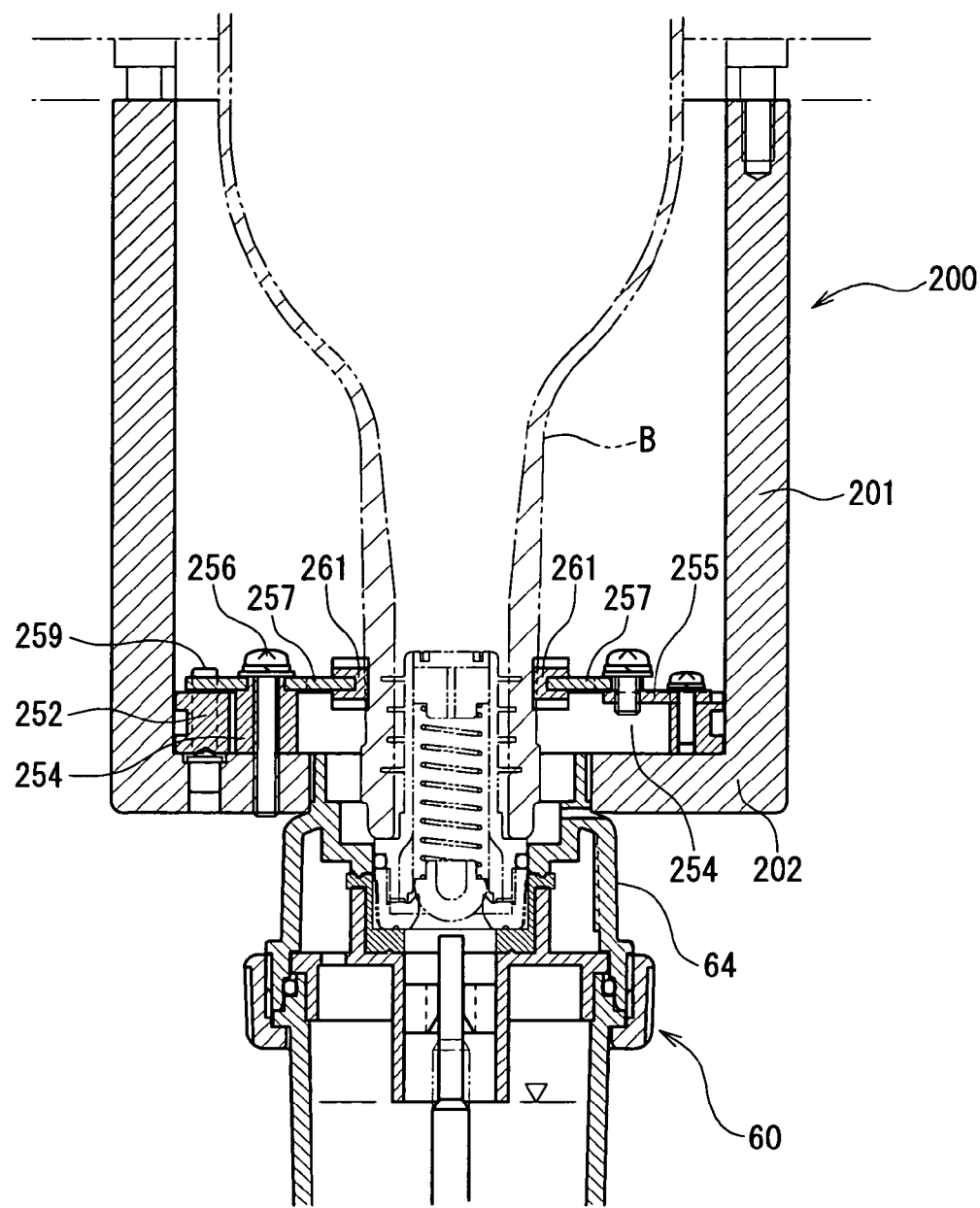
FIG. 16 is a cross sectional view taken along the Z-Z line in FIG. 14.

Explanation will be given based on FIGS. 14 to 16. A clamp structure 250 is intended for preventing the bottle attached to the fluid extracting device from coming off. The clamp structure is not an indispensable element, but when a relatively large bottle is held or when a bottle having a head in a peculiar shape is held, it is advantageous to provide the clamp structure for more stable support.

The basic portion of the clamp structure 250 is composed of a ring 252 capable of rotating in a circumferential direction relative to the tubular portion 201 of the bottle holder 200, and a fixing plate 254 provided to be able to slide relative to an inner peripheral face of the ring 252. A pair of cam plates 255 in a shape similar to a baseball home base are provided on the ring 252, and a pair of clamp arms 257 substantially in an S shape each pivotally supported by a pivotal shaft 256 at one end and being open at the other end are provided on the fixing plate 254. A lock piece 258 capable of engaging with a lock pin 259 protruding onto the ring 252 is provided at a terminal on one end side of each of the clamp arms 257. By this engaging, both of the clamp arms 257 are kept in an open state with a predetermined interval between them so as to allow the bottle head portion to insert therein. A grip member 261 as a slip stopper is provided on a bottle side of each of the clamp arms 257.

Here, when the bottle head portion is inserted between both of the clamp arms 257 and attached to the fluid extracting device, the ring 252 is rotated clockwise. The cam plates 255 also rotate in accordance with the rotation of the ring 252. The rotating cam plates 255 are brought into contact with end faces of the clamp arms 257 to turn the clamp arms 257 in a clamp direction by a cam action. When the pair of clamp arms 257 turn in the clamp direction respectively, the distance between them is narrowed to firmly clamp the bottle head portion. A gripping effect of the grip member 261 further ensures the clamping. Finally, when a screw 253 is fastened to fix the ring 252 so as to prevent the ring 252 from rotating, the clamping work is finished. The clamp can be released by a work through the reverse procedure to the procedure described above. The prevention of the bottle from coming off by the clamp structure 250 prevents air from entering the fluid extracting device and the bottle due to the coming off, resulting in the effective prevention of the deterioration of the fluid to be extracted.

(Bottle Centering Device)

Figure 18:
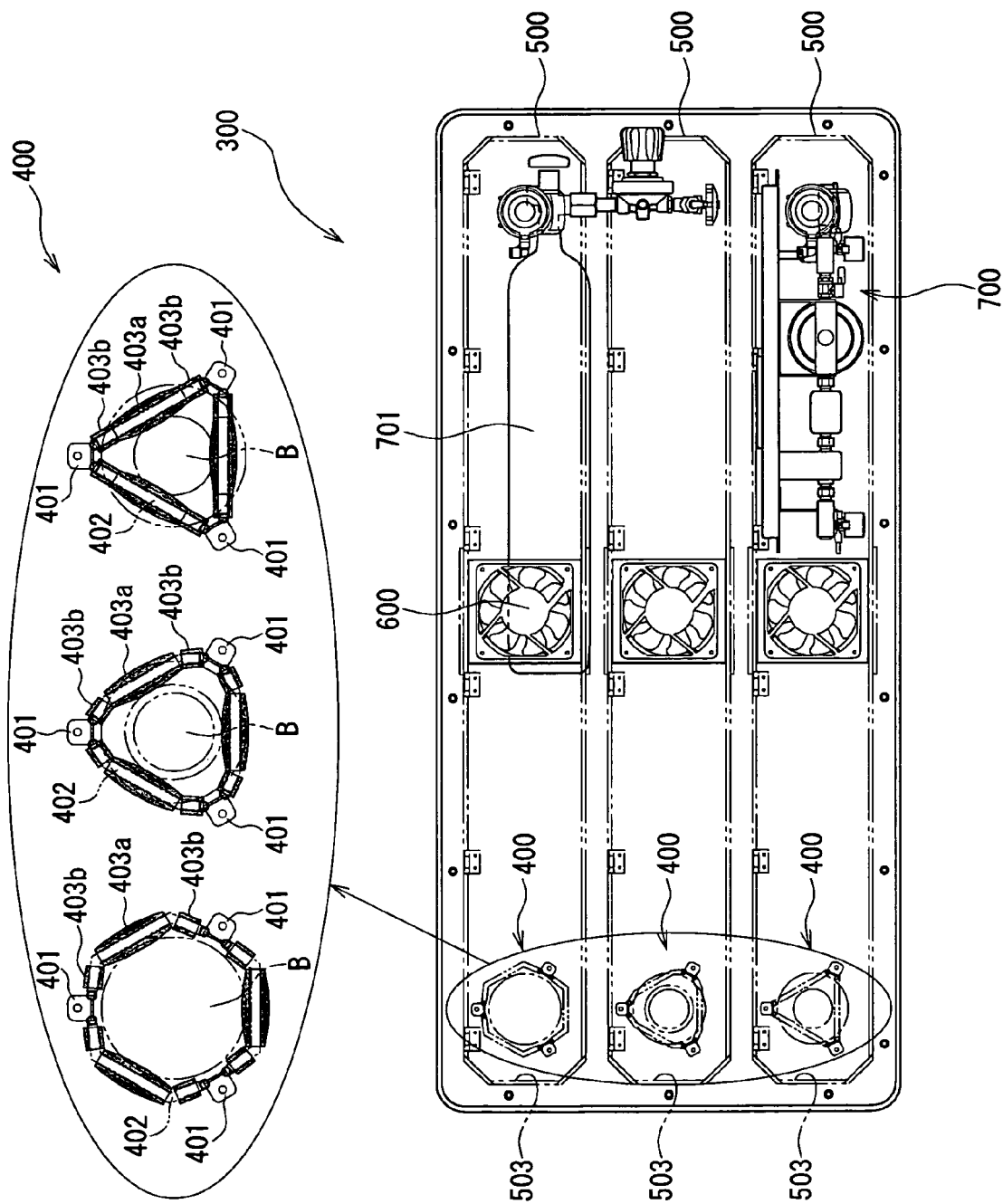
FIG. 18 is a schematic plane view showing the arrangement structure of cooling devices and so on disposed on the display table.

As shown in FIG. 8, a centering device 400 for keeping the bottle B in an upright state is provided for each of the bottle holders 200 on the table plate 301. The centering device 400 is so structured that a plurality of posts 401 are provided to stand on the table plate 301, springs 402 are hung at, for example, three places of the periphery as shown in the drawing, and the bottle B is kept upright, being placed upside down relative to the bottle holder 200. For example, as shown in FIG. 18, each of the springs 402 includes such a structure that a long cylindrical member 403a and short cylindrical members 403b, 403b, which are made of a soft material such as synthetic rubber or synthetic resin and arranged in a tripartite state in an axial direction, are loosely fitted to the spring 402 so as to be able to rotate. In passing, the centering device 400 is not limited to this form, but such a centering device or the like is also included that, for example, a link mechanism including rollers is elastically brought into contact with a bottle.

The use of the bottle holder 200 and the centering device 400 installed on the display table as described above makes it possible to attach the bottle B of wine or the like to the fluid extracting device 60 with a single operation. Further, when the fluid extracting devices 60 are used being mounted on the table plate of a wine display table or the like, for example, when they are applied to a bottle setting table or the like at a wine bar or the like, an aesthetic appearance is provided to the eyes of customers, and on the working staff side, operability in pouring wine to a glass or the like is good and handling of bottles is facilitated. Further, when a wine display table or the like on which these fluid extracting devices 60 are installed is used on a wagon-type carrier or the like with casters for the display table, it can be moved freely on the floor for serving, which greatly enhances availability.

(Structure of Display Table)

Figure 17:
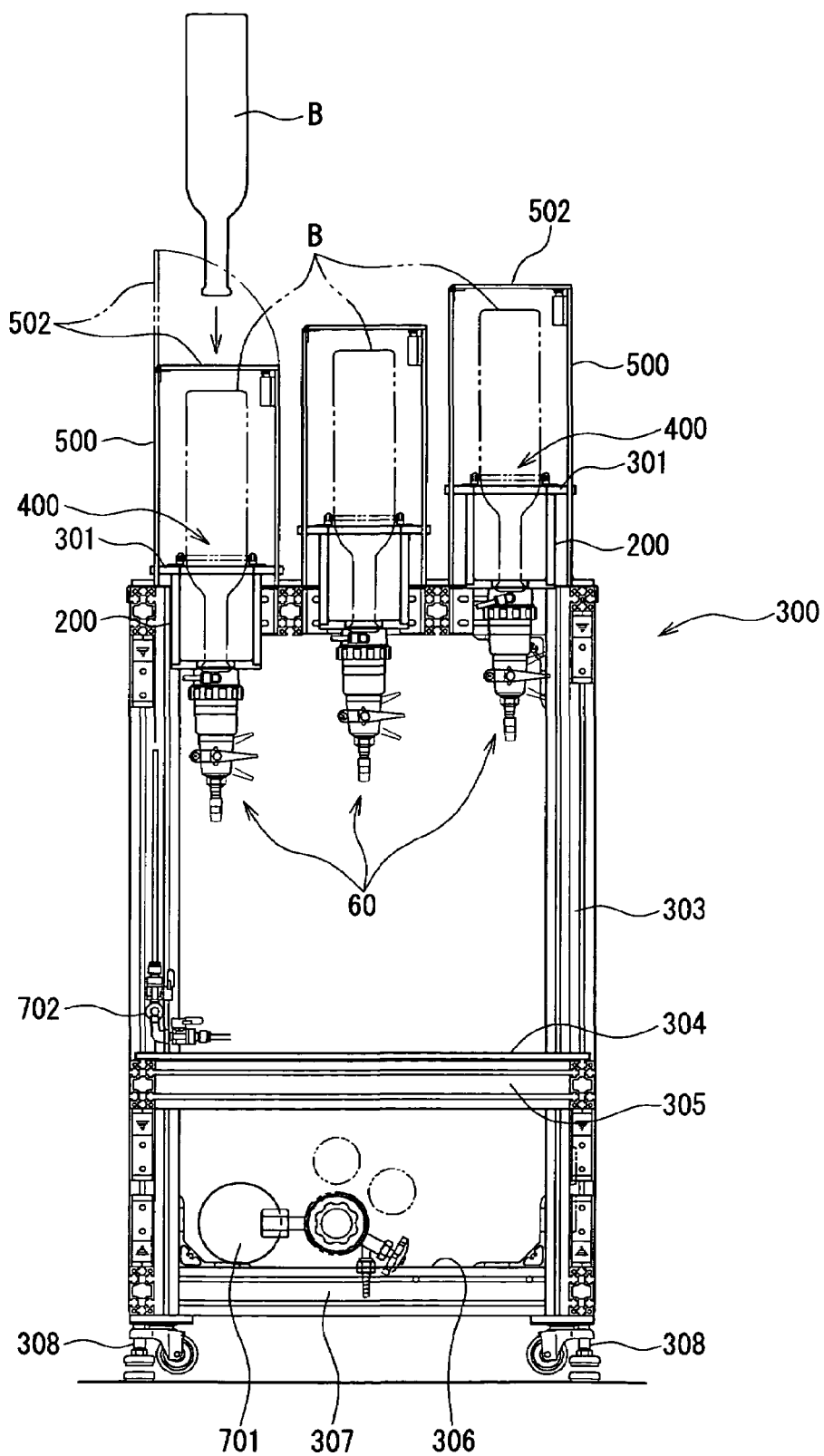
FIG. 17 is a schematic explanatory view of a display table having fluid extracting units mounted thereon.
Figure 19:
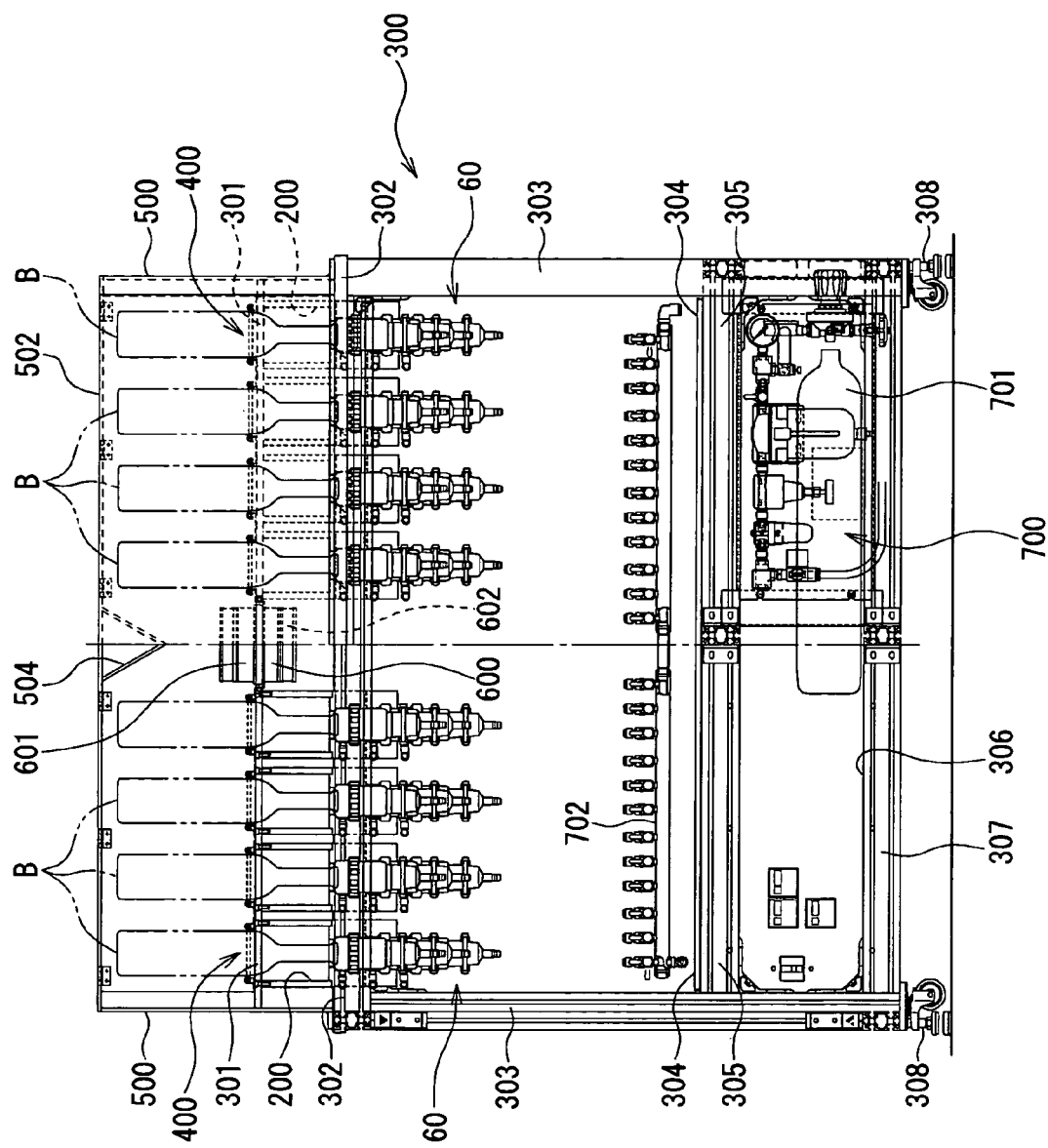
FIG. 19 is an explanatory rear view of the display table including a fluid extracting system.

FIG. 17 is a schematic explanatory view showing the arrangement structure when box cells housing the fluid extracting devices are attached to the display table and a deterioration preventive gas supply unit is connected thereto. FIG. 18 is a schematic plane view schematically showing the arrangement relationship structure in a planar see-through state, in which parts of the box cells, the fluid extracting devices, and so on are left and other portions are omitted. FIG. 19 is an explanatory view showing the rear state of the arrangement structure in which the box cells housing the fluid extracting devices are attached to a display table. As shown in FIGS. 17 to 19, a display table 300 includes such a structure that an upper frame 302 on which a table plate 301 is placed is disposed on a top portion, a prop frame 303 is provided extending downward from each of four corners of the upper frame 302, a partition frame 305 on which a partition plate 304 is placed is disposed in a middle portion, and a bottom frame 307 on which a bottom plate 306 is placed is disposed on a bottom portion. Legs 308 with casters are appropriately provided at lower ends of the prop frames 303 or at lower face of four corners of the bottom frame 307. A deterioration preventive gas supply unit 700 for feeding the N gas to the fluid extracting device 60 for each of the bottles B is disposed on the bottom plate 306 of the display table 300.

The deterioration preventive gas supply unit 700 includes a gas bomb 701 set on the bottom plate 306, and a pipe 702 connecting between the gas bomb 701 and the gas supply ports 81 of the fluid extracting devices 60. As shown in FIG. 17, the pipe 702 is disposed closer to a customer side (left side in the drawing) so as not to obstruct the servicing operation at hand on the working staff side. In a pipe passage connected to a downstream side from an outlet gas cork of the gas bomb 701, provided is a pressure control device in which a first change-over valve used at the time of bomb replacement, a first pressure gauge, a filter for removing impurities such as dust and dirt, a pressure regulator for adjusting the pressure at an actually used value, a filter for removing gas smell, a second change-over valve used at the time of cleaning the filter for removing gas smell, and a second digital pressure gauge and an analog pressure gauge for fine adjustment of the adjusted pressure are arranged in sequence, though reference numerals and symbols of these components are omitted in the drawings. A pipe passage on a further downstream side is inserted to the partition plate 304 to extend along the partition frame 305. The pipe 702 above the partition plate 304 branches off to individual nozzles, which are connected to the gas supply ports 81 of the respective fluid extracting devices 60, so that the N gas is fed thereto. In FIGS. 18 and 19, gas tubes though which the N gas is sent to the respective gas supply ports 81 from the pipe 702 are omitted. The pressure control device such as the pressure regulator is structured to be controlled by a controller. Control devices such as the controller are appropriately disposed in a not-shown control box installed on the bottom plate 306 of the display table. In passing, a gas supply source of the deterioration preventive gas supply unit 700 is not limited to the one having the gas bomb 701 mounted thereon explained here, but a different gas producing device may be mounted on the display table such as a wagon or the like. Alternatively, as such a type mounted on the display-table, such a gas supply structure may be adopted that a gas bomb or a gas producing device as a different gas supply structure is installed outside the display table such as a wagon, this is connected to a gas tank placed on the display table by a gas tube or the like, and when an amount of gas in the gas tank becomes small, a new supply of the N gas is made from the gas bomb or the gas producing device outside the display table.

(Regarding Display Table in Stepped Form)

As previously described, when the fluid extracting devices 60 are installed on a bottle setting table, a wine display table, or the like at a wine bar or the like, the arrangement thereof in plurality or in a plurality of lines lengthwise and widthwise on the table plate of the display table will result in flat arrangement, which is not attractive to look at for a customer side from an aesthetic viewpoint, and at the same time, problems such as inconvenience for a serving side in pouring to a glass may possibly occur.

In this embodiment, in order to cope with such problems, further improvements and devices are made so as to form the display table in a stepped form. As shown in FIG. 17, the structure with the stepped arrangement is such that the heights of the positions where the bottle holders 200 are attached to the table plate 301 are varied from one another, thereby enabling the stepped arrangement. FIG. 17 shows a state in which the table plate 301 of the display table having an upper end of the bottle holder 200 fixed thereto is arranged at the lowest position to form a first step, as shown on the left side of the drawing. The next second step on the right side thereof (center in FIG. 17) is formed in such a manner that the table plate 301 having the shown bottle holder 200 fixed thereto is fixed to a one-step higher intermediate portion of a box cell 500, and further, a third step shown on the right side of the drawing is formed in such a manner that the table plate 301 having the bottle holder 200 fixed thereto is fixed to the highest position of the box cell 500, so that the height becomes larger in this order. Such structure allows bottles to be arranged widthwise and lengthwise and in a stepped form on the display table, which results in the arrangement with the backward side being higher for customers, so that they can easily recognize the brand and kind of each bottle of wine or the like, and which results in the arrangement with the forward side being higher for working staff, so that they can easily pour wine or the like to a glass or the like from bottles, and therefore, this arrangement facilitates the operation at hand and allows the working staff to easily serve customers, for example, to wait on the customers (refer to FIG. 19). The bottle B can be put into and out of the box cell 500 by opening a cover plate 502 that can be opened/closed freely as shown by an imaginary line in FIG. 17. This cover plate 502 is so structured that, when it is closed, it is held by, for example, an electromagnet or the like fixed to an upper end of a wall portion 503.

(Regarding Structure of Cooling Device in Display Table or the Like)

In the application to bottle service at a wine bar or the like as described above, what is important is, in addition to the prevention of the quality deterioration, cooling bottles to a proper optimum temperature and maintaining and keeping this temperature. In this embodiment, as shown in FIG. 17, the box cells 500 made of acryl or the like are formed and these box cells 500 are placed on the top plate of the display table 300. Each of the box cells 500 is composed of wall portions 503, 503 provided along side peripheries, the cover plate 502 provided at a top, and the table plate 301 provided at a bottom. The bottle holders 200 are attached to the table plates 301 of the box cells 500 at the intervals corresponding to those of the bottles, and the table plates 301 to which the bottle holders 200 are attached are fixed to the wall portions 503 of the box cells 500, so that cooling chambers are constituted in respective spaces each defined by the box cell 500 and the table plate 301. The height positions where the table plates 301 are attached to the wall portions 503 are made different from one another so that level difference among the respective box cells 500 is made in the bottom portions of the wall portion 503. The fluid extracting devices 60 are attached to the bottle holders 200, and the centering devices 400 are provided on the table plates 301. To a top face of each of the box cells 500, the cover plate 502 similarly constituted of a transparent material such as acryl is attached by a hinge or the like so as to be freely opened and closed, and when the cover plate 502 is opened, it is possible to freely attach a bottle of wine or the like to the bottle holder 200 and replace it with another one. Further, the table plates 301 can be arranged in a stepped form as described above in such a manner that the heights of the positions where the box cells 500 are attached to the wall portions 503 are changed stepwise in a unit of each lengthwise line or widthwise line. Therefore, the wall portions 503 of the box cells 500 are so formed that the heights of the wall portions 503 are also changed stepwise in a unit of each line so as to form the cooling chambers in a stepped form. In passing, the box cells may be those, though not shown, formed to have horizontal cross sections in a rectangular shape or a circular shape, and the shape thereof is not to be particularly limited. As is understood from the above explanation, the significance of disposing the bottle holders 200 is to set the positions where the fluid extracting devices 60 are operated at positions where easy handling is possible in such cases when the table plates 301 are arranged in a stepped form, and to eliminate the necessity of cooling the entire bottle since attaching the bottle holders 200 to the table plates 301 reduces the volume capacity of the cooling chambers where the bottles of wine or the like are cooled, so that cooling efficiency is enhanced.

The structure of the cooling device will be explained based on FIG. 18. FIG. 18 is a schematic plane view where portions of the box cells, the fluid extracting devices, and the centering devices are left and other portions are omitted in order to schematically explain a planar see-through state of the structure of the arrangement relationship in which the cooling devices and so on are arranged on the display table 300. The box cells 500 formed to be long sideways constituting the cooling chambers which are sealed spaces are placed in three lines on the table plate 301 of the display table 300. A cooling device 600 is disposed at the center of each of the box cells 500 which are long sideways, and a plurality of bottles of wine and so on, though not shown, are contained on both right and left sides thereof. The centering devices 400 shown on a left end of FIG. 18 show the states in which the centering devices 400 are holding bottles, being adapted to the sizes or the like of the positions of bottle body portions or neck portions that are in contact with the centering devices 400, for example, being adapted to a small-diameter size, a medium-diameter size, and a large-diameter size from the bottom of the drawing. Here, the shown states are operation states when each bottle is held by the long cylindrical member 403a and the short cylindrical members 403b, 403b, all being loosely fitted to the aforementioned spring 402 and made of a soft material such as synthetic rubber or synthetic resin, and the states of actions of the tripartite long and short cylindrical members 403a, 403b for performing a holding operation adaptable to the three kinds of forms are schematically shown. As is understood from the drawing, a bottle is held mainly by a spring force of the springs 402 when the long cylindrical member 403a comes in contact with the bottle. The reason why the cylindrical members are structured in tripartite as the long and short cylindrical members 403a, 403b is to enhance follow-ability for the respective diameters of the bottles in contact therewith.

(Schematic Structure of Cooling Device)

The cooling device 600 is a cooling device using a thermoelectric module of a Peltier element. This cooling device keeps the inside of the cooling chamber, which is a sealed space of the box cell 500, at a constant temperature by cooling air or a refrigerant to an appropriate temperature. Cooling devices using the Peltier element have recently been drawing attention as non-use fluorocarbon cooling devices from a viewpoint of the environmental protection of the earth. In a commonly-used cooling device using a compressor, the increase in size of the device itself is inevitable, and driving noises of the compressor are also unpleasant to ears at wine bars and so on, and therefore, it is preferable to use the cooling device using the thermoelectric module of the Peltier element as the cooling device for bottles of wine and so on. The thermoelectric module is made of a member having two conductive faces and having a function that when a direct current is passed, one of the conductive faces is heated and the other is cooled. Accordingly, one of the faces functions as a generating surface or a heat radiating surface and the other face functions as a heat absorbing surface.

The schematic structure of the cooling device 600 of this embodiment is such that it has a plurality of stages of disc-shaped thermoelectric modules in which a large number of P-type semiconductors and N-type semiconductors having a Peltier effect are connected in series, and as shown in FIG. 19, it has, on both sides of the table plate 301 of the box cell 500 constituting the cooling chamber in which air as a heat medium is filled in a sealing state, a heat absorbing portion 601 disposed inside the cooling chamber of the box cell 500 and a heat radiating portion 602 disposed outside the cooling chamber, and it operates such that heat absorbed in the heat absorbing surface is heat-exchanged to the heat radiating surface outside the box cell while a not-shown stirring fan disposed to pass through the center portion of the thermoelectric modules is stirring air as the heat medium, and the heat is released to the atmosphere from the heat radiating portion 602 by radiator fins provided outside the box cell and by a not-sown heat release fan, thereby cooling the inside of the cooling chamber. Incidentally, the cooling device 600 may be attached to the wall portion 503 of the box cell 500. Convection deflection plates 504, 504 are provided at a center portion of the cover plate 502 to form a downward V shape and arranged so as to further promote an air stirring effect. FIG. 19 shows the state in which temperature controllers for indicating the cooling temperatures inside the box cells 500 by the cooling devices 600 are disposed, together with breakers, on a panel in a lower left of a rear portion of the display table 300, and the pressure gauges, the change-over valves, and so on of the pressure control device of the deterioration preventive gas supply unit 700 are disposed in a lower right of the rear portion of the same so as to be easily seen and easily operated by working staff.

In the cooling device 600 having the thermoelectric modules built therein, it is possible to make fine temperature setting for temperature adjustment by giving switch changeover function, and it is also possible to adjust a cooling capability by varying the number of the semiconductors constituting the thermoelectric modules on the respective stages, so that temperature control can be conducted in such a manner that atmospheres at different optimum temperatures are formed depending on producing areas, brands, and so on of wine or the like and delicate fine adjustment to the optimum temperature is made individually bottle by bottle.

In FIG. 18, one cooling device 600 is disposed in each of the box cells 500 made of acryl or the like on each step of the table plates 301 arranged in a three-stepped form in the wagon-type wine display table 300, and each of the cooling chambers is kept to be airtight individually. One cooling device 600 is placed horizontally at the center of each of the individual cooling chambers. In passing, the table plates 301 are not limited to those in the stepped form shown in the drawing but may be one piece of a flat-plate type table plate, and with such stepped-type table plates or flat-plate type table plate, a form in which one box cell and one cooling device are disposed for one bottle may be adopted. When the form in which one box cell and one cooling device are disposed for one bottle is adopted, fine adjustment in temperature control can be made bottle by bottle according to the variety and brand of wine or the like, so that it is possible to give a service capable of providing quality and taste under the optimum temperature control.

Further, the temperature control of the cooling devices 600 can be monitored individually for each box cell through the indication by temperature indicators, though not shown, which are installed for the respective box cells on front panels disposed on the partition frame 305 and the bottom frame 307 of the display table 300. The temperature control of the cooling devices 600 is performed by a control device such as the controller disposed in the not-shown control box installed on the bottom plate 306 of the display table.

INDUSTRIAL AVAILABILITY

According to a fluid extracting device of the present invention, it is possible to provide a fluid extracting device that is capable of extracting a fixed amount of a fluid such as wine anytime, only requires an easy operation for the extraction, and is usable for a long-term preservation. Moreover, it is possible to provide a fluid extracting unit and a fluid extracting system that can provide the convenience in the display and service at a wine bar or the like through the use of the fluid extracting device.

What is claimed is:

1. A fluid extracting device comprising:
   a device body having a fluid storage portion capable of storing fluid via a down-flow valve press-fitted in a bottle head portion of an inverted bottle in an airtight state;
   an extracting portion with an extraction valve positioned under said device body and allowing the fluid in said fluid storage portion to flow down to the outside via said extraction valve;
   a gas supply port through which a deterioration preventive gas is to be supplied into the fluid storage portion;
   a first driving portion of an upper portion of a valve-driving portion for putting said down-flow valve into operation;
   a second driving portion of a lower portion of said valve-driving portion for putting the extraction valve into operation; and
   an operation mechanism which is capable of operating the valve-driving portion from the outside, said valve-driving portion being moved in a first position for a fluid storage state with said down-flow valve actuated when said valve-driving portion is moved upwardly from a neutral position representative of a neutral state to said upper portion, said valve-driving portion being thereafter moved downwardly from said first position via said first position via said neutral position to a second position for an extraction state to the outside with said extraction valve actuated.

2. The fluid extracting device according to claim 1, wherein an upper portion of said fluid storage portion has a mounting portion that is attachable to and detachable from a head portion of a bottle, which is placed upside down, in an airtight state; and
   wherein the mounting portion allows, when being attached to the head portion of the bottle, the fluid flowing down from the head portion of the bottle to flow down into said fluid storage portion in an airtight state.

3. The fluid extracting device according to claim 2, wherein said fluid flows down via the down-flow valve attached to the head portion of the bottle.

4. The fluid extracting device according to claim 3,
   wherein said operation mechanism is capable of operating the first driving portion and the second driving portion simultaneously or separately from the outside.

5. The fluid extracting device according to claim 4, wherein, when said operation mechanism is arranged to be capable of operating said first driving portion and said second driving portion simultaneously, the second driving portion keeps said extraction valve closed while the first driving portion is driving said down-flow valve to open, and the down-flow valve is kept closed while the second driving portion is driving the extraction valve to open.

6. The fluid-extracting device according to claim 3, wherein said down-flow valve comprises:
   a valve body having a hollow portion attachable to the head portion of said bottle;
   a discharge valve capable of advancing and retreating in the hollow portion relative to the valve body;
   a biasing member disposed in the hollow portion in order to bias the discharge valve in a direction of said fluid storage portion; and
   an abutted portion having a down-flow hole that is closed when abutted on by the biased discharge valve, wherein a recessed portion communicating with the hollow portion is formed in an end portion of the valve body in the direction of said fluid storage portion, and wherein at least one vertical groove is formed on an inner wall surrounding the hollow portion inside the hollow portion at least from the abutted portion.

7. The fluid extracting device according to claim 6, wherein said biasing member is a coil spring and a center axis of the coil spring is nonlinear.

8. The fluid-extracting device according to claim 1, wherein said extraction valve has a large-diameter rod portion capable of closing a down-flow hole portion provided in a lower portion of said fluid storage portion.

9. The fluid extracting device according to claim 8, wherein a driving rod capable of moving upward and downward by the operation of said operation mechanism is provided in said device body, and wherein an upper end portion of the driving rod is capable of functioning as said first driving portion and a lower end portion of the driving rod is capable of functioning as said second driving portion.

10. The fluid extracting device according to claim 9, wherein a rod bearing body is provided in an upper portion of said fluid storage portion, and wherein the rod bearing body includes an inner bearing supporting said driving rod to be able to slide, an inside-diameter portion surrounding the inner bearing, a down-flow passage for said fluid formed between the inner bearing and the inside-diameter portion, a gas supply passage capable of supplying the deterioration preventive gas into said fluid storage portion, and a ring-shaped projecting portion including a hollow portion communicating with the down-flow passage and projecting to such a position that an end portion of the ring-shaped projecting portion is capable of coming into contact with the fluid stored in the fluid storage portion.

11. The fluid-extracting device according to claim 1, wherein an air vent valve for exhausting air inside said fluid storage portion is provided.

12. The fluid-extracting device according to claim 1, wherein said extracting portion comprises:
an outer cylinder connectable to a lower portion of said fluid storage portion;
an inner cylinder fitted in an inner peripheral portion of the outer cylinder;
a guide cylinder vertically extending in a range from the lower portion of the fluid storage portion to a position of a substantially center portion of the extracting portion;
a joint member fitted in a lower inner peripheral portion of the guide cylinder to be connected to a lower end portion of the driving rod;
an up and down movement member supporting a lower end portion of the joint member and fitted to be able to move upward and downward in a lower outer peripheral portion of the guide cylinder; and
an extraction pipe connected to a lower portion of the joint member, the extraction pipe extending to a position lower than a lower end portion of the extracting portion.

13. The fluid-extracting device according to claim 1, wherein said operation mechanism comprises:
an operation arm provided to be able to swing on an outer side of said extracting portion; and
the joint member coupled to the up and down movement member and the driving rod in an airtight state, and wherein said up and down movement member is movable upward and downward by the operation arm.

14. The fluid-extracting device according to claim 1, wherein said fluid storage portion is constituted of a transparent material or a translucent material.

15. The fluid-extracting device according to claim 2, wherein the head portion of said bottle and said mounting portion are connectable to each other via a coupling assist including a wide ring press-fitted to the head portion of said bottle and a coupling nut so formed that an inner peripheral portion thereof is capable of being in close contact with the wide ring.

16. A fluid extracting device for extracting a fluid from a bottle containing the fluid via a down-flow valve attached to a head portion of the bottle, which is placed upside down, the device comprising:
a device body having a mounting portion attachable to and detachable from the head portion of the bottle in an airtight state and a fluid storage portion capable of storing the fluid flowing down via the down-flow valve in an airtight state;
an extracting portion positioned under said device body, for allowing the fluid in said fluid storage portion to flow down via an extraction valve;
a gas supply port through which a deterioration preventive gas is to be supplied into a fluid down-flow passage between the down-flow valve and the extraction valve;
a first driving portion for putting the down-flow valve into operation;
a second driving portion for putting the extraction valve into operation; and an operation mechanism capable of operating the first driving portion and the second driving portion simultaneously or separately from the outside.

17. The fluid extracting device according to claim 16, wherein, when said operation mechanism is arranged to be capable of operating said first driving portion and said second driving portion simultaneously, the second driving portion keeps said extraction valve closed while the first driving portion is driving said down-flow valve to open, and the down-flow valve is kept closed while the second driving portion is driving the extraction valve to open.

18. A fluid extracting method for extracting a fluid from a bottle containing the fluid, the method comprising the steps of:
replacing a bottle stopper originally attached to a head portion of the bottle with a down-flow valve in an atmosphere of deterioration preventive gas, the down-flow valve comprising a valve body having a hollow portion to be press fitted in the head portion of the bottle, and a discharge valve capable of advancing and retreating in the hollow portion relative to said valve body and biased toward the closed position;
storing the fluid in an airtight storage body filled with a deterioration preventing gas by opening the down-flow valve to cause the fluid to flow down; and
discharging the fluid stored in the airtight storage body to the outside by opening an extraction valve included in the airtight storage body.

19. The fluid extracting method according to claim 18, wherein said step of storing the fluid in the airtight storage body includes a step of exhausting air inside said airtight storage body and supplying the deterioration preventing gas.

20. The fluid extracting method according to claim 18, wherein each of the steps of storing the fluid in the airtight storage body and discharging the fluid stored in the airtight storage body includes a step of continuously supplying the deterioration preventive gas.

21. A fluid extracting unit for fluid in which a fluid extracting device is mounted on a display table, the unit comprising:
said fluid extracting device being the fluid extraction device according to claim 1 and being fixed to an opening portion of a table plate of the display table.

22. The fluid extracting unit for fluid according to claim 21, wherein a bottomed bottle holder is fixed to a rear face side of the opening portion of said table plate and said fluid extracting device is fixed to a lower portion of said bottle holder.

23. The fluid extracting unit for fluid according to claim 22, wherein said bottle holder has an opening at a center of a bottom portion thereof and a side wall rising from a peripheral edge of the bottom portion, an upper end of said side wall being fixed to the rear face of said table plate, and wherein said fluid extracting device is attached to said opening of the bottom portion.

24. The fluid extracting unit for fluid according to claim 21, wherein a centering device for holding the bottle is disposed on an upper face side of the opening portion of said table plate.

25. The fluid extracting unit for fluid according to claim 24 wherein said centering device is constituted of a biasing/holding means that comes in contact with an outer periphery of the bottle at least at three points to bias the bottle toward a center.

26. The fluid extracting unit for fluid according to claim 25, wherein said biasing/holding means is constituted of a spring means having at least three springs hung between props.

27. The fluid extracting unit for fluid according to claim 22, wherein said bottle holder is provided with a clamp structure for preventing the bottle to which said fluid extracting device is attached from coming off.

28. The fluid extracting unit for fluid according to claim 21, wherein one or a plurality of box cells are disposed on said display table.

29. The fluid extracting unit for fluid according to claim 21, wherein a plurality of box cells are disposed on said display table.

30. The fluid extracting unit for fluid according to claim 29, wherein said plurality of box cells are arranged with level difference in a stepped form.

31. The fluid extracting unit for fluid according to claim 28, wherein said box cell is made of a transparent or translucent material.

32. The fluid extracting unit for fluid according to claim 28, wherein said box cell has a wall portion surrounding a side portion and a cover plate at a top portion thereof.

33. The fluid extracting unit for fluid according to claim 32, wherein a lower edge portion of the wall portion of said box cell is fixed onto said display table.

34. The fluid extracting unit for fluid according to claim 32, wherein the cover plate of said box cell is formed to be freely opened/closed.

35. The fluid extracting unit for fluid according to claim 32, wherein a bottom portion of said box cell is constituted of the table plate of said display table.

36. The fluid extracting unit for fluid according to claim 28, wherein at least one box cell is disposed on said display table.

37. The fluid extracting unit for fluid according to claim 29, wherein said display table has a plurality of table plates and each of said box cells is disposed on each of said table plates.

38. The fluid extracting unit for fluid according to claim 37, wherein each of said box cells has a wall portion surrounding a side portion, and wherein the plurality of table plates of said display table are arranged in a stepped form with a plurality of steps by making different mounting positions of the respective table plates on the wall portions of said box cells.

39. The fluid extracting unit for fluid according to claim 38, wherein said plurality of box cells are so formed that heights of said wall portions of the respective box cells are changed stepwise so as to form stepped heights.

40. The fluid extracting unit for fluid according to claim 35, wherein said wall portion, said cover plate and said table plate define a space.

41. The fluid extracting unit for fluid according to claim 40, wherein said space forms a cooling chamber.

42. The fluid extracting unit for fluid according to claim 28, wherein at least one cooling device is disposed in said box cell.

43. The fluid extracting unit for fluid according to claim 42, wherein said cooling device is constituted of a thermoelectric module using a Peltier element.

44. The fluid extracting unit for fluid according to claim 42, wherein a temperature control device is provided in said cooling device.

45. The fluid extracting unit for fluid according to claim 21, wherein a deterioration preventive gas supply unit is disposed on said display table.

46. A fluid extracting system for fluid provided with a fluid extracting unit having a fluid extracting device, the system comprising:
said fluid extracting unit being the fluid extracting unit according to claim 21.

47. The fluid extracting system for fluid according to claim 46, wherein said fluid extracting unit is provided with at least one cooling device, the cooling device having a temperature control device, and a deterioration preventive gas supply unit, the gas supply unit including a gas bomb, a gas supply pipe and a pressure control device.

48. The fluid extracting system for fluid according to claim 46, wherein said fluid extracting unit is provided with a deterioration preventive gas supply unit disposed on said display table, and wherein said gas supply unit comprises: a gas bomb; a gas supply pipe connecting from the gas bomb to said fluid extracting device; and a pressure control device disposed on a downstream side of the gas bomb and constituted of a pressure valve, a pressure regulator, and a pressure gauge.

* * * * *